United States Patent
Ginetti

(10) Patent No.: US 10,192,020 B1
(45) Date of Patent: Jan. 29, 2019

(54) METHODS, SYSTEMS, AND COMPUTER PROGRAM PRODUCT FOR IMPLEMENTING DYNAMIC MANEUVERS WITHIN VIRTUAL HIERARCHIES OF AN ELECTRONIC DESIGN

(71) Applicant: Cadence Design Systems, Inc., San Jose, CA (US)

(72) Inventor: Arnold Ginetti, Antibes (FR)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 15/283,081

(22) Filed: Sep. 30, 2016

(51) Int. Cl.
*G06F 17/00* (2006.01)
*G06F 17/50* (2006.01)

(52) U.S. Cl.
CPC ...... *G06F 17/5081* (2013.01); *G06F 17/5068* (2013.01); *G06F 17/5072* (2013.01); *G06F 2217/04* (2013.01); *G06F 2217/74* (2013.01)

(58) Field of Classification Search
None
See application file for complete search history.

(56) References Cited

U.S. PATENT DOCUMENTS

| | | | |
|---|---|---|---|
| 5,008,882 A | 4/1991 | Peterson | |
| 5,568,396 A | 10/1996 | Bamji | |
| 5,581,474 A | 12/1996 | Bamji | |
| 5,604,680 A * | 2/1997 | Bamji | G06F 17/5068 716/118 |
| 6,256,768 B1 | 7/2001 | Igusa | |
| 6,289,412 B1 | 9/2001 | Yuan | |
| 6,507,932 B1 | 1/2003 | Landry | |
| 6,507,941 B1 | 1/2003 | Leung | |
| 6,516,456 B1 | 2/2003 | Garnett | |
| 6,738,957 B2 | 5/2004 | Gont | |
| 7,062,475 B1 | 6/2006 | Szabo | |
| 7,065,729 B1 | 6/2006 | Chapman | |
| 7,117,468 B1 | 10/2006 | Teig | |
| 7,117,473 B1 * | 10/2006 | Knol | G06F 17/5072 716/124 |
| 7,120,892 B1 * | 10/2006 | Knol | G06F 17/5072 716/124 |

(Continued)

OTHER PUBLICATIONS

Notice of Allowance dated Oct. 31, 2018 for U.S. Appl. No. 15/283,042.

(Continued)

*Primary Examiner* — Leigh M Garbowski
(74) *Attorney, Agent, or Firm* — Vista IP Law Group, LLP

(57) ABSTRACT

Disclosed are methods, systems, and articles of manufacture for implementing dynamic maneuvers within virtual hierarchies of an electronic design. These techniques identify or generate a plurality of figure groups at one or more virtual hierarchies in a layout portion and receive a request to descend into or ascend from a figure group at a virtual hierarchy of the one or more virtual hierarchies. In response to the received request, these techniques update a layout view into an updated layout view at least by exposing layout design details in the figure group for native editing according to the request to descend into or ascend from the figure group and optionally synchronize a corresponding schematic design view according to the updated layout view.

20 Claims, 18 Drawing Sheets

(56) References Cited

U.S. PATENT DOCUMENTS

| | | | |
|---|---|---|---|
| 7,146,595 B2* | 12/2006 | Knol | G06F 17/5072 716/119 |
| 7,310,793 B1 | 12/2007 | Teig | |
| 7,418,686 B1* | 8/2008 | Knol | G06F 17/5072 716/118 |
| 7,469,255 B2* | 12/2008 | Kusterer | G06F 17/30961 |
| 7,478,352 B2 | 1/2009 | Chaplin | |
| 7,555,739 B1 | 6/2009 | Ginetti et al. | |
| 7,710,420 B2 | 5/2010 | Nonclercq | |
| 7,805,698 B1* | 9/2010 | Ferguson | G06F 17/5072 716/103 |
| 7,810,064 B2* | 10/2010 | Ladin | G06F 3/0482 716/55 |
| 7,865,857 B1 | 1/2011 | Chopra | |
| 7,921,096 B2 | 4/2011 | Allen | |
| 7,949,983 B2 | 5/2011 | Eshun | |
| 8,028,243 B1 | 9/2011 | O'Riordan | |
| 8,255,845 B2 | 8/2012 | Ginetti | |
| 8,271,920 B2 | 9/2012 | Cho et al. | |
| 8,375,348 B1 | 2/2013 | Raj | |
| 8,438,530 B2* | 5/2013 | Giffel | G06F 17/5077 716/139 |
| 8,527,890 B2 | 9/2013 | Harada | |
| 8,560,998 B1 | 10/2013 | Salowe | |
| 8,595,237 B1* | 11/2013 | Chaudhary | G06F 17/301 707/741 |
| 8,640,078 B2 | 1/2014 | Majumder | |
| 8,640,079 B2 | 1/2014 | Majumder | |
| 8,671,368 B1 | 3/2014 | Salowe | |
| 8,839,174 B2 | 9/2014 | Suiter | |
| 8,930,863 B2 | 1/2015 | Nayak et al. | |
| 9,003,349 B1 | 4/2015 | Salowe | |
| 9,129,081 B2* | 9/2015 | Ginetti | G06F 17/5068 |
| 9,141,746 B1* | 9/2015 | Ginetti | G06F 17/5068 |
| 9,182,948 B1* | 11/2015 | O'Riordan | G05B 19/0426 |
| 9,208,273 B1 | 12/2015 | Morlat | |
| 9,223,915 B1* | 12/2015 | Ginetti | G06F 17/5022 |
| 9,317,650 B2 | 4/2016 | Chen | |
| 9,396,301 B1 | 7/2016 | Lee | |
| 9,652,579 B1 | 5/2017 | Arkhipov | |
| 9,659,138 B1 | 5/2017 | Powell | |
| 9,779,193 B1* | 10/2017 | Ginetti | G06F 17/5045 |
| 9,842,178 B2* | 12/2017 | Ferguson | G06F 17/5027 |
| 9,904,756 B1 | 2/2018 | Ruehl | |
| 9,934,354 B1* | 4/2018 | Kukal | G06F 17/5081 |
| 1,002,580 A1 | 7/2018 | Kaufman | |
| 2003/0101331 A1* | 5/2003 | Boylan | G06F 17/5045 712/36 |
| 2004/0083210 A1 | 4/2004 | Ochiai | |
| 2004/0088118 A1 | 5/2004 | Jensen | |
| 2004/0088487 A1 | 5/2004 | Barroso et al. | |
| 2005/0091627 A1 | 4/2005 | Satapathy | |
| 2005/0120316 A1 | 6/2005 | Suaya | |
| 2005/0138591 A1 | 6/2005 | Shirai | |
| 2006/0184540 A1 | 8/2006 | Kung | |
| 2006/0200789 A1* | 9/2006 | Rittman | G06F 17/5068 716/52 |
| 2006/0218156 A1 | 9/2006 | Schechinger | |
| 2006/0282492 A1 | 12/2006 | Suaya | |
| 2008/0172638 A1 | 7/2008 | Gray et al. | |
| 2009/0005926 A1 | 1/2009 | Kaubisch | |
| 2009/0199143 A1 | 8/2009 | Schlotman | |
| 2010/0306729 A1 | 12/2010 | Ginetti | |
| 2011/0016423 A1 | 1/2011 | Brubaker | |
| 2011/0093829 A1 | 4/2011 | Orita | |
| 2011/0107281 A1* | 5/2011 | Sun | G06F 17/5081 716/106 |
| 2011/0191303 A1 | 8/2011 | Kaufman | |
| 2012/0054699 A1 | 3/2012 | Cho et al. | |
| 2013/0187941 A1 | 7/2013 | Noon | |
| 2013/0290834 A1* | 10/2013 | Ginetti | G06F 17/5068 715/243 |
| 2014/0177940 A1 | 6/2014 | Nakagaki | |
| 2014/0264738 A1 | 9/2014 | Barry | |
| 2014/0325460 A1 | 10/2014 | Ferguson | |
| 2015/0012895 A1 | 1/2015 | Chen | |
| 2015/0067632 A1 | 3/2015 | Chen | |
| 2015/0269297 A1 | 9/2015 | Tuan | |
| 2015/0339430 A1 | 11/2015 | Nifong et al. | |
| 2015/0363478 A1 | 12/2015 | Haynes | |
| 2017/0124235 A1 | 5/2017 | Ferguson | |
| 2017/0235848 A1 | 8/2017 | Van Dusen | |
| 2017/0249416 A1 | 8/2017 | Sendig | |

OTHER PUBLICATIONS

Non-Final Office Action dated Nov. 27, 2017 for U.S. Appl. No. 15/282,778.

Non-Final Office Action dated Nov. 30, 2017 for U.S. Appl. No. 15/199,903.

Non-Final Office Action dated Dec. 11, 2017 for U.S. Appl. No. 15/283,089.

Notice of Allowance dated Apr. 16, 2018 for U.S. Appl. No. 15/283,089.

Notice of Allowance dated Apr. 23, 2018 for U.S. Appl. No. 15/282,739.

Notice of Allowance dated May 1, 2018 for U.S. Appl. No. 15/282,778.

Final Office Action dated May 30, 2018 for U.S. Appl. No. 15/199,903.

Non-Final Office Action dated Jun. 15, 2018 for U.S. Appl. No. 15/283,042.

Non-Final Office Action dated Sep. 10, 2018 for U.S. Appl. No. 15/283,052.

NA9109385, "Design Extensions to Contents View", IBM Technical Disclosure Bulletin, Sep. 1991, vol. 34, No. 4A, pp. 385-388 (4 pages).

* cited by examiner

402A

402C 402G  404G

4021

METHODS, SYSTEMS, AND COMPUTER PROGRAM PRODUCT FOR IMPLEMENTING DYNAMIC MANEUVERS WITHIN VIRTUAL HIERARCHIES OF AN ELECTRONIC DESIGN

CROSS REFERENCE TO RELATED U.S. PATENT APPLICATIONS

This Application is related to U.S. patent application Ser. No. 15/199,903 entitled "METHODS, SYSTEMS, AND COMPUTER PROGRAM PRODUCT FOR IMPLEMENTING AN ELECTRONIC DESIGN BY MANIPULATING A HIERARCHICAL STRUCTURE OF THE ELECTRONIC DESIGN" and filed on Jun. 30, 2016, U.S. patent application Ser. No. 15/282,739 entitled "METHODS, SYSTEMS, AND COMPUTER PROGRAM PRODUCT FOR IMPLEMENTING ENGINEERING CHANGE ORDERS WITH FIGURE GROUPS AND VIRTUAL HIERARCHIES", U.S. patent application Ser. No. 15/282,778 entitled "METHODS, SYSTEMS, AND COMPUTER PROGRAM PRODUCT FOR IMPLEMENTING SYNCHRONOUS CLONES FOR AN ELECTRONIC DESIGN", application Ser. No. 15/283,052 entitled "METHODS, SYSTEMS, AND COMPUTER PROGRAM PRODUCT FOR IMPLEMENTING LEGAL ROUTING TRACKS ACROSS VIRTUAL HIERARCHIES AND LEGAL PLACEMENT PATTERNS", U.S. patent application Ser. No. 15/283,089 entitled "METHODS, SYSTEMS, AND COMPUTER PROGRAM PRODUCT FOR IMPLEMENTING A FLOORPLAN WITH VIRTUAL HIERARCHIES AND FIGURE GROUPS FOR AN ELECTRONIC DESIGN", U.S. patent application Ser. No. 15/283,042 entitled "METHODS, SYSTEMS, AND COMPUTER PROGRAM PRODUCT FOR DYNAMICALLY ABSTRACTING VIRTUAL HIERARCHIES FOR AN ELECTRONIC DESIGN". The contents of the aforementioned U.S. patent applications are hereby expressly incorporated by reference for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Modern electronic design processes often generate a schematic design and then proceeds through various phases from the schematic design to create a physical layout. For example, electronic design processes may start with design planning or floorplanning to generate a floorplan and proceed through at least the placement and routing process to generate a fully routed physical layout. The goals of design planning or floorplanning may include, for example, silicon utilization, increase of design performance, etc.

Furthermore, a physical layout may be constructed as a flat layout where every circuit component design in placed in a single hierarchy despite the fact that certain circuit component designs may functionally belong to a sub-module which may in turn belongs to a module that further reports to a cell in an IC (integrated circuit) design. Such a flat layout has its own advantages. For example, a flat layout may be easier for placement and routing although dealing with millions or billions of design components during the design planning or floorplanning stage is impractical at best, if not entire impossible. Flat layouts have their own disadvantages. For example, connectivity search processes are slow for flat layouts, especially when the design size or complexity increases.

Rather than a flat layout, some approaches generate a hierarchical layout with either a bottom-up or a top-down approach. A top-down approach begins the implementation process at the top or highest hierarchy and proceeds to lower hierarchies until it reaches the lowest hierarchy to complete an IC design. With the top-down approach, the functional cells at a higher hierarchy may be brought into the layout canvas while each cell include its own pins, ports, or terminals (collectively pin for singular or pins for plural hereinafter). The details of these functional cells at lower hierarchies are not yet exposed and will be designed at respective lower hierarchies as the top-down approach migrates to lower hierarchies. As a result of the non-exposure or unavailability of lower hierarchies (e.g., the lower hierarchies have not yet been implemented), a circuit designer working on the higher hierarchy may need to estimate the size of each cell and guess or guesstimate the locations of pins or terminals for the cell. The estimated cell may be too big to waste invaluable space on silicon or may be too small to accommodate all the devices therein.

In addition to the manual efforts to create the location, identification, etc. for a pin of a cell, these guesstimated pin or terminal locations unlikely to be optimal for connecting with the pins or ports of the devices within the cell. Either way, multiple iterations may be required for even a single cell. In addition, even if the circuit designer knows how these pins are connected to each other, the circuit designer may only align or offset these pins by manipulating the cell. In the event that a designer groups a set of components or cells and intends to create a logical cell for the set, the pins of the logical cell or their identifications thereof (e.g., names of the pins) have to be manually created. The designer will then have to find the corresponding pin identifications in the schematic design and associated these manually created identifications with the corresponding pin identifications.

Bottom-up approaches begin with the design of discrete circuit components and proceed to higher hierarchies as the designs of lower hierarchies are complete until the design for the top or highest hierarchy is complete. In these bottom-up approaches, pins and their identifications as well as locations are determined at lower hierarchies in their respective cells. At the higher hierarchies, these pins often present a challenge to routing these pins of an actual or virtual cell because these pins are determined individually for each cell and independent of each other and may thus cause misalignment of pins or terminals at higher hierarchies where these cells are assembled and supposed to be interconnected. To rectify these problems such as pin or terminal misalignment at higher hierarchies, the design process must return to the lower hierarchies where the devices with the misaligned pins are placed, adjust the placement of the devices, and determine whether the pins or terminals are aligned at the next higher hierarchy. These conventional approaches must then proceed to the next higher hierarchy to determine whether there exist other misalignment problems. These conventional approaches may thus iterate multiple times until an acceptable or desirable solution is found. Therefore, there is a need for a better approach to manipulate the hierarchies of an electronic design to effectively and efficiently create a cell for a group of devices.

Despite these shortfalls, hierarchical layout generation may be more beneficial for design planning or floorplanning because circuit component designs may be encapsulated in different hierarchies and may thus be manipulated with ease by manipulating higher hierarchy cells or blocks. Hierarchical layouts nevertheless present their own shortcomings. For example, hierarchical layouts are difficult for placement or routing of the design. Hierarchical layouts also consume much more computational resources at least during the design planning or floorplanning stage. For example, every hierarchy in the layout needs to be saved at least in a persistent or non-persistent form and thus consumes much more disk I/O (input/output) or network I/O, especially when the layout is still at the early planning stage where circuit component designs or blocks are often moved around or modified.

Conventional design planning tools or floorplanners often operate on individual component basis and use various techniques (e.g., force-based techniques) to pull or push components on individual basis until certain criteria are met. A designer or an EDA (electronic design automation) tool has to literally select individual circuit component designs and move the individually selected circuit component designs in a layout canvas until certain criteria are met. Although some EDA tools have attempted to improve this shortcoming by allowing designers to generate a module so that the generated module may be manipulated as a block, such attempts nevertheless fall short for the same reasons—individual identification and selection of circuit component designs during at least the module generation process. In addition, such module generation processes disturb the physical hierarchy that corresponds to the schematic hierarchy when a module is generated for a group of circuit component designs. Therefore, there is a need for implementing design planning for an integrated circuit design with virtual hierarchies to address at least the aforementioned problems and to provide a more computational resource-efficient and effective approach for early physical design stages such as floorplanning, placement, etc.

With the advent of virtual hierarchies for electronic designs as described in the U.S. patent applications listed in the Section entitled Cross Reference to Related U.S. Patent Applications, there have been no effective techniques to maneuver within virtual hierarchies or manipulate figure groups located at various virtual hierarchies, especially in a flat portion of a layout or a flat layout.

Therefore, there exists a need for methods, systems, and computer program products for implementing dynamic maneuvers within virtual hierarchies of an electronic design.

SUMMARY

Disclosed are method(s), system(s), and article(s) of manufacture for implementing dynamic maneuvers within virtual hierarchies of an electronic design in one or more embodiments. Some embodiments are directed at a method for implementing dynamic maneuvers within virtual hierarchies of an electronic design.

In some embodiments, these techniques identify or generate a plurality of figure groups at one or more virtual hierarchies in a layout portion and receive a request to descend into or ascend from a figure group at a virtual hierarchy of the one or more virtual hierarchies. In response to the received request, these techniques update a layout view into an updated layout view at least by exposing layout design details in the figure group for native editing according to the request to descend into or ascend from the figure group and optionally synchronize a corresponding schematic design view according to the updated layout view.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
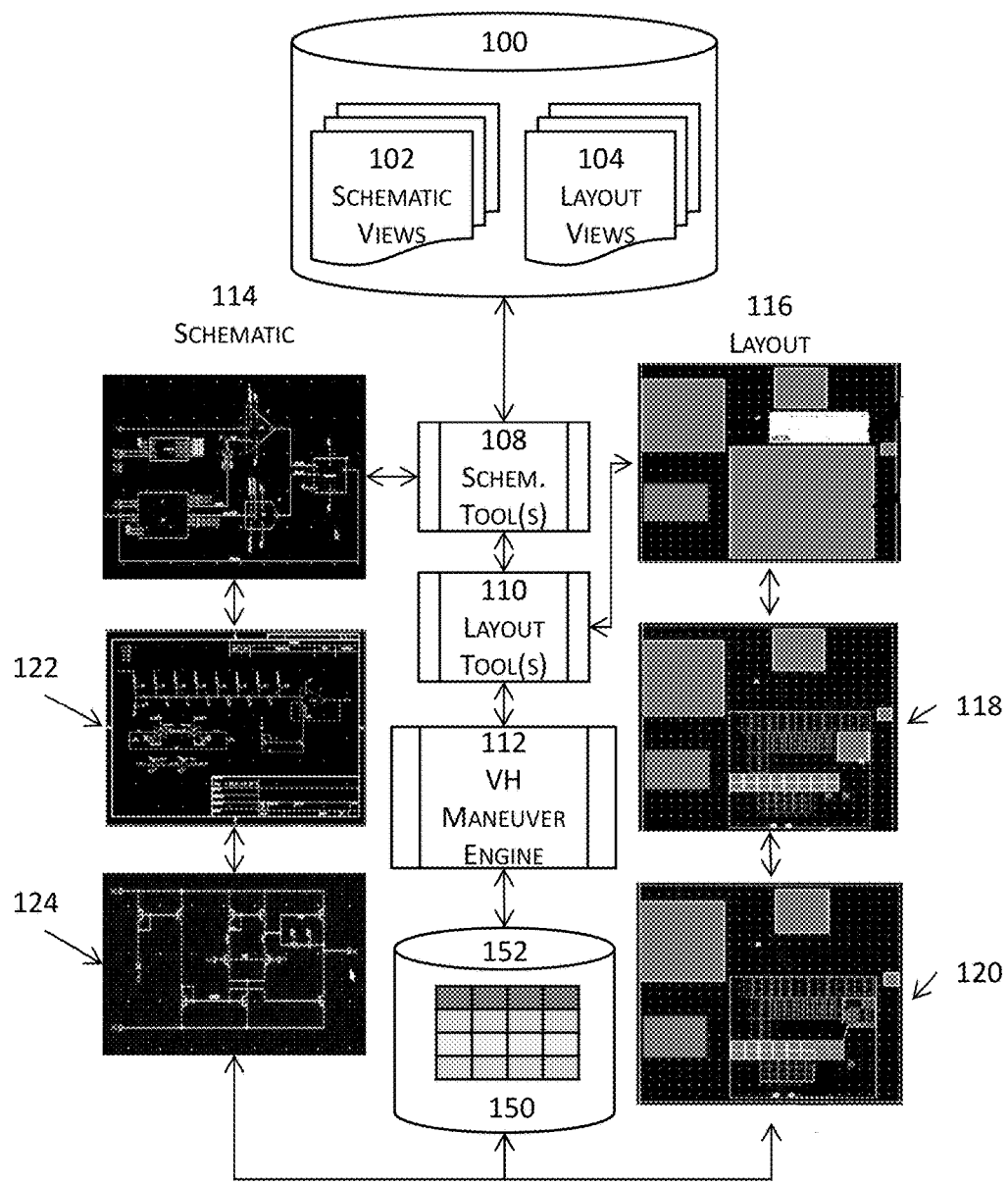
FIG. 1 illustrates high level block diagrams of simplified systems for implementing dynamic maneuvers within virtual hierarchies of an electronic design in one or more embodiments.

Various techniques are directed to implementing dynamic maneuvers within virtual hierarchies of an electronic design in various embodiments. In some embodiments, the described techniques generate a flat layout or a portion thereof for an electronic design, and the flat layout or the portion thereof remains flat until it is desired or required to transform the electronic design into a hierarchical one having more than one physical hierarchy. To address the problems with presenting too many layout circuit component designs in a user interface window displaying the flat layout or the portion thereof, these techniques described herein create the layout from a schematic and automatically create virtual hierarchies corresponding to the schematic hierarchies. The virtual hierarchies and the corresponding schematic hierarchies are further bound together, and the binding information may be saved in a persistent (e.g., on disk) or non-persistent (e.g., random dynamic memory) computer readable storage device.

In some embodiments, these techniques described herein create a layout and track each layout circuit component design against its corresponding schematic circuit component design during the creation of the layout. The correspondence or mapping between the layout circuit component design and its corresponding schematic circuit component design may be saved as a set of binding information. These techniques may then create figure groups at various virtual hierarchies that correspond to the respective schematic hierarchies in the corresponding schematic design based in part or in whole upon the set of binding information.

These figure groups and various virtual hierarchies may be saved in one or more data structures and may be decorated with the corresponding information from the corresponding schematic design and/or the layout. For example, a figure group at a virtual hierarchy may be decorated, annotated, or associated with the information (e.g., identifiers, links, etc.) about the figure group master, the group or listing of figure groups to which the figure group belongs, corresponding schematic instance in the schematic design, the schematic master of the schematic instance, the schematic hierarchy at which the corresponding schematic instance is located, etc. or similar information about the layout, if available. A figure group may also include or be decorated with its location in the layout (e.g., the relative or absolute coordinates of the lower left-hand corner of the figure group) as well as a list of layout circuit component designs and their respective locations in the figure group.

With these one or more data structures being set up, these techniques produce a layout with dynamic, configurable abstractions where any specific figure group in the layout may be directly descended into or ascended out of while one or more other figure groups or portions of the layout remain abstracted as some abstract representations (e.g., polygonal shapes having no internal design details). These techniques further leverage the binding information and/or these one or more data structures to provide an option to update the corresponding schematic view to display the corresponding schematic circuit component designs according to what is displayed in the layout view.

For example, when the designer instructs the layout tool to descend into a specific figure group including a plurality of layout circuit component designs in the layout view, these techniques provide an option to the designer to determine whether the schematic view is to be updated to display the schematic circuit component designs (e.g., details within a schematic instance) corresponding to the plurality of layout circuit component designs. If the designer chooses to view the corresponding schematic view, these techniques reference the binding information to identify and display the corresponding schematic circuit component designs in the updated schematic view.

When the designer is done with accessing the internal contents of the figure group, the designer may instruct the layout tool to ascend out of the internal details of the figure group. These techniques may then maneuver to the immediately higher virtual hierarchy for this particular figure group and abstracts the figure group into an abstracted representation (e.g., a rectilinear shape resembling the bounding box of the figure group showing no internal layout details). The designer may again be provided with the option of updating the corresponding schematic view to reflect the maneuver in the layout.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

FIG. 1 illustrates high level block diagrams of simplified systems for implementing dynamic maneuvers within virtual hierarchies of an electronic design in one or more embodiments. In these embodiments, one or more layout tools 110 (e.g., a layout editor, a placement tool, a floorplanner, a routing tool, etc.) may be coupled with a virtual hierarchy maneuver engine 112 that dynamically maneuvers among different figure groups or different virtual hierarchies in a layout 116.

These schematic design 114 or layout 116 may be generated during one or more prior sessions (e.g., a schematic editing session, a layout editing session, etc.) for the same electronic design (e.g., the schematic design 114 and the layout 116) and subsequently stored for subsequent reuse so that the same views may be cached or retrieved without regeneration that requires additional resource consumption. For example, the layout may be previously generated as a flat layout, and these techniques may automatically create figure groups according to, for example, various schematic instances in the corresponding schematic design.

In the alternative, the virtual hierarchy maneuver engine 112 may perform its designated functions while the layout 116 is being generated. For example, the layout may be generated by inserting layout circuit component designs according to the schematic circuit component designs while tracking the correspondence or mapping between them. Before or after the layout circuit component designs corresponding to a schematic instance have been inserted into the layout, a figure group corresponding to the schematic instance may be automatically generated in the layout. Therefore, figure groups and hence virtual hierarchies may be generated in an existing layout or may be generated in a layout while the layout is being created.

In addition, these schematic design 114 or the layout 116 may be generated in response to a database command such as a database query that is executed by the layout tools including the database engine to select circuit component designs (e.g., a figure group instance, the master thereof, etc.) for dynamic descent into and ascent out of a figure group in the layout.

In operation, the one or more layout tools 110 may be coupled to one or more schematic tools 108 that natively access a schematic design 114 of an electronic design (e.g., an IC design). The one or more layout tools 110 may natively access a layout 116 including a plurality of figure groups and receive an instruction to descend into a first figure group. The one or more layout tools 110 may identify the first figure group instance (and optionally the figure group master) that includes or is decorated with a list of layout circuit component designs with their respective locations in the first figure group. These one or more layout tools 110 may then update the first figure group in the layout view 116 to represent the first figure group with the list of layout circuit component designs in their respective locations as shown in the updated layout view 118. Various layout views 102 (e.g., 116, 118, 120, etc.) may be stored in a non-transitory persistent or non-persistent computer readable storage medium 100 for subsequent reuse. The non-transitory persistent or non-persistent computer readable storage medium 100 or another non-transitory persistent or non-persistent computer readable storage medium (not shown) may also store various schematic views 104 (e.g., 114, 122, 124, etc.) for subsequent reuse. These one or more layout tools 110 may be coupled to the one or more schematic tools 108 to issue one or more inter-process function calls so that these one or more schematic tools 108 may also update the schematic view 114 into the updated schematic view 122 showing the schematic circuit component designs corresponding to the first figure group descended into in the updated layout view 118.

Upon receiving another instruction to further descend into a second figure group within the first figure group, these one or more layout tools 110 may further identify the second figure group instance (and optionally the second figure group master) that includes or is decorated with a list of layout circuit component designs with their respective locations in the second figure group. These one or more layout tools 110 may then update the second figure group in the layout view 118 to represent the second figure group with the list of layout circuit component designs in their respective locations as shown in the updated layout view 120. These one or more layout tools 110 may be coupled to the one or more schematic tools 108 to issue one or more inter-process function calls so that these one or more schematic tools 108 may also update the schematic view 120 into the updated schematic view 124 showing the schematic circuit component designs corresponding to the second figure group descended into in the updated layout view 120.

In the examples illustrated in FIG. 1, the one or more layout tools 110 may also ascend out of a figure group and update the layout views accordingly. Similarly, these one or more schematic tools 108 may also optionally update the schematic views to reflect the ascent in the layout view. One or more of these layout views and/or schematic views may be cached or stored in a database 150 in dynamic memory or a persistent storage device 152. These cached or stored views may be indexed by using, for example, the figure groups' identifiers, the figure group masters' identifiers, the schematic instances' identifiers, the schematic masters' identifiers, etc. as a database key (e.g., a primary key) so that subsequent retrieval for reuse is more efficiently accomplished.

Figure 2:
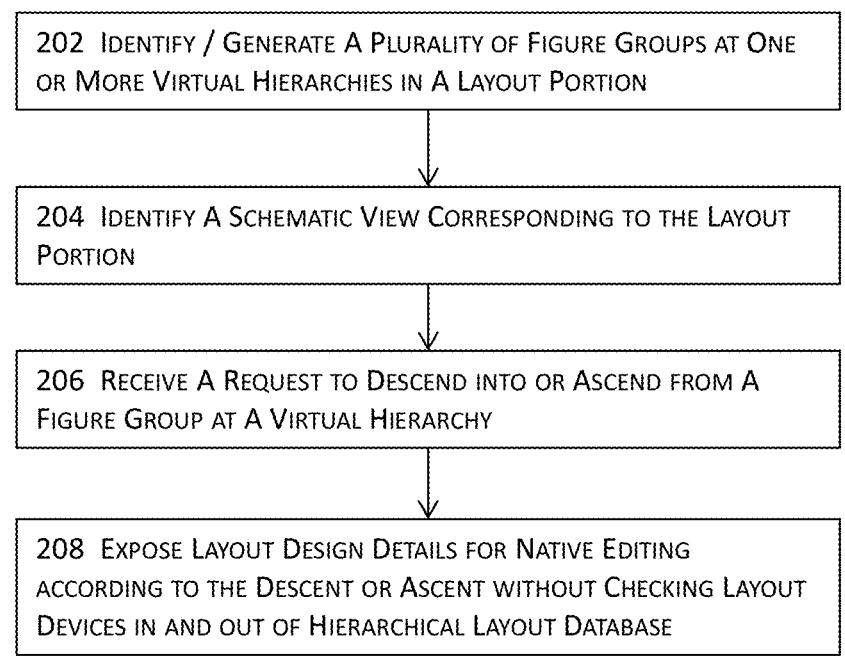
FIG. 2 illustrates a high level block diagram for implementing dynamic maneuvers within virtual hierarchies of an electronic design in one or more embodiments.

FIG. 2 illustrates a high level block diagram for implementing dynamic maneuvers within virtual hierarchies of an electronic design in one or more embodiments. In some embodiments, a plurality of figure groups or virtual blocks (collectively "figure group" for singular or "figure groups" for plural) at one or more virtual hierarchies may be identified at 202 in at least a layout portion of a layout when these one or more figure groups already exist in the layout portion. In some other embodiments where the layout portion contains no figure groups, the plurality of figure groups may be created at 202 according to, for example, the corresponding one or more schematic hierarchies in the corresponding schematic design. In some of these embodiments, virtual hierarchies in the layout portion and the corresponding schematic hierarchies in the corresponding schematic design exhibit a one-to-one relation that may be further saved as a part of binding information between the layout and the corresponding schematic design. For example, a figure group may be created at a top virtual hierarchy for a plurality of layout circuit component designs when the schematic instance corresponding to the plurality of layout circuit component designs is located at the top schematic hierarchy.

A schematic view corresponding to the layout portion may be optionally identified at 204. As described above with reference to FIG. 1, these techniques provide an option to update the schematic view to reflect the dynamic maneuvers in the layout view, and thus the schematic view of the corresponding schematic design may be optionally identified.

A request to descend into or ascend from a figure group of the plurality of figure groups may be received at 206. Layout design details within the figure group may then be exposed at 208 for native editing by, for example, a layout editor according to the descent or ascent maneuver. Although a figure group may be accessed and manipulated in an identical or substantially similar manner as a physical block or cell, a figure group is not a physical block or cell and does not alter the physical hierarchical structure or the layout database of the layout. Therefore, even a flat layout having a single hierarchy may include a plurality of virtual hierarchies that provide all the benefits but without the disadvantages of physical hierarchies.

For example, a physical cell may be modified by first checking out the physical cell from the layout database, modifying the contents within the physical cell, and then checking the modified physical cell back into the layout database and hence requires multiple network roundtrips to the layout database that is usually stored in a database system remotely located from the computing system executing various functions to implement dynamic maneuvers. In contrast, a figure group at a virtual hierarchy logically represents a grouping of a plurality of layout circuit component designs in a layout and may be natively accessed by a layout tool without the aforementioned network roundtrips for checking out and checking in a physical cell or block from the layout database.

In some embodiments, the layout portion or even the entire layout may be maintained as a flat layout until or unless it is desired or required to convert the flat layout into a hierarchical layout having multiple physical hierarchies. With the virtual hierarchies, figure groups, and the capabilities of descending into and ascending from any figure group in the flat layout, these techniques provide all the benefits of both a flat layout (e.g., fewer network roundtrips to and from the layout database, fewer expensive database operations, etc.) and a hierarchical layout (e.g., easier organization and component selection capabilities, less cluttered layout view, ability to descend into a group of components without affecting other components in other groups of components, etc.) without the disadvantages of a flat layout (e.g., difficulties in selecting or organizing components, more cluttered layout views, etc.) or a hierarchical layout (e.g., more network roundtrips to and from the hierarchical layout database, more expensive database operations or transactions, etc.) It shall be noted that these techniques described herein apply with full and equal effects to a hierarchical layout in the sense that these techniques employ figure groups at virtual hierarchies and thus reduce the need for physical cells or blocks and physical hierarchies that lead to at least the aforementioned disadvantages.

Figure 3A:
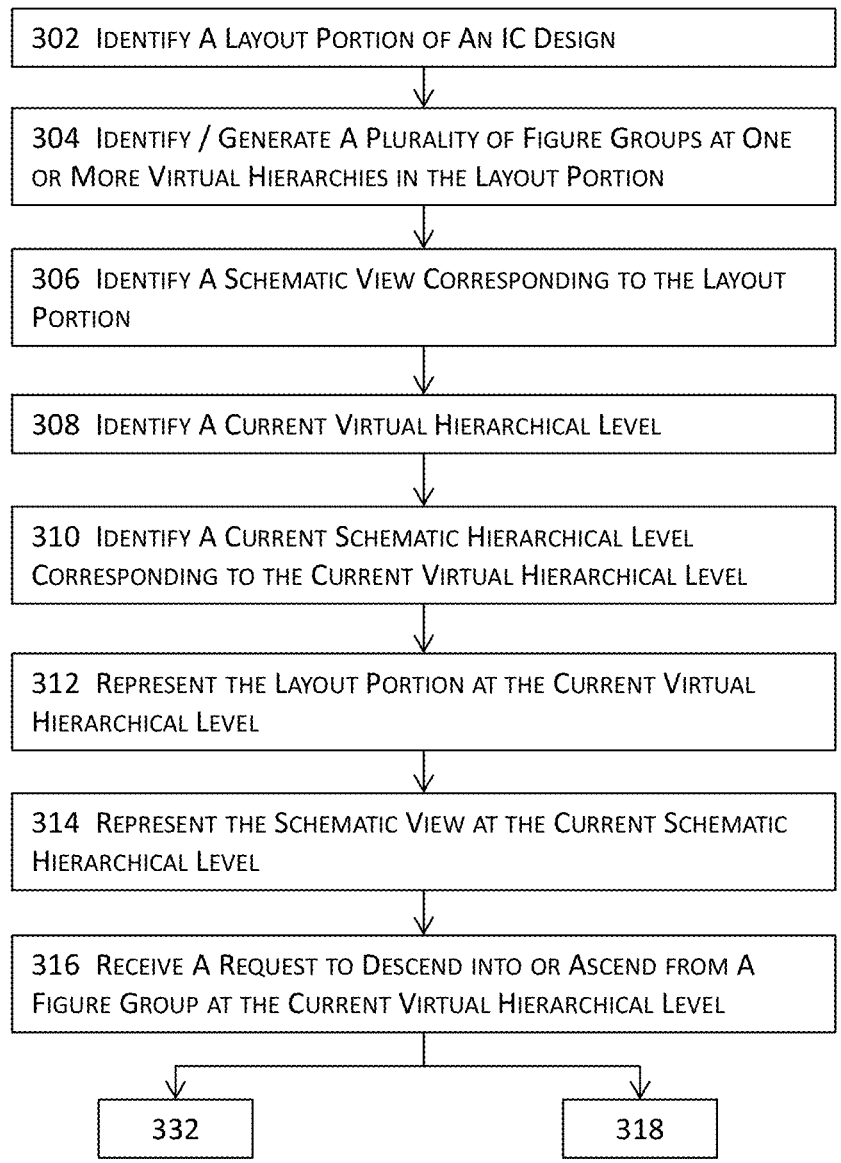
FIG. 3A illustrates a more detailed block diagram for implementing dynamic maneuvers within virtual hierarchies of an electronic design in one or more embodiments.

FIG. 3A illustrates a more detailed block diagram for implementing dynamic maneuvers within virtual hierarchies of an electronic design in one or more embodiments. In these embodiments, a layout portion of an integrated circuit (IC) design may be identified at 302 in an identical or substantially similar manner as that described with reference to 202 of FIG. 2. The layout portion or even the entire layout may be flat in some embodiments or hierarchical in some other embodiments while these techniques nevertheless apply with full and equal effects.

A plurality of figure groups at one or more virtual hierarchies may be identified, if existing, or created, if non-existing, at 304 in the layout portion. As described above, these techniques may generate figure groups by using the binding information between the layout and the corresponding schematic at the time the layout is being populated in some embodiments.

For example, a figure group may be created for a plurality of layout circuit component designs according to a schematic instance corresponding to the plurality of layout circuit component designs. In this example, the figure group is created to be located at a virtual hierarchy that corresponds to the schematic hierarchy at which the schematic instance is located. In some of these embodiments, the layout may be generated as a flat layout, rather than a hierarchical layout having multiple physical hierarchies because the virtual hierarchies generated as a result of creating figure groups provide the same advantages as physical hierarchies do, without the disadvantages of physical hierarchies.

In some other embodiments, a layout may be pre-generated as a flat or a hierarchical layout. These techniques may create a figure group for a set of layout circuit component designs by identifying a schematic instance from the schematic design and then by identifying the set of layout circuit component designs corresponding to the identified schematic instance. This set of layout circuit component designs may then be grouped into the figure group at a virtual hierarchy that corresponds to the schematic hierarchy at which the schematic instance is located. In some other embodiments, these techniques may start with identifying a schematic master and proceed with identifying schematic instances instantiated from the schematic master. For each of these schematic instances, a figure group is then created at a virtual hierarchy corresponding to the respective schematic hierarchy. For nested instance (e.g., an instance including another instance), these techniques may generate the corresponding figure groups in either a depth-first manner or a breadth-first manner.

A schematic view may be optionally identified at 306 in an identical or substantially similar manner as that described with reference to reference numeral 204 in FIG. 2 described above. A current virtual hierarchy includes the virtual hierarchical level at which a figure group is displayed or represented in the layout portion. For example, a figure group may be located at a first virtual hierarchy, and the layout circuit component designs may be located at a second virtual hierarchy immediately below the first virtual hierarchy. When the figure group is represented in the layout portion as an abstraction (e.g., a rectilinear shape representing the boundary of the figure group) without showing further internal layout designs, the current virtual hierarchy is determined to be the first virtual hierarchy but not the second virtual hierarchy because the internal layout details of the figure group are suppressed or hidden in the layout portion.

A current schematic hierarchy corresponding to the current virtual hierarchy may be identified at 310. In the example identified above, the schematic hierarchy at which the schematic instance corresponding to the figure group is located may be identified as the current schematic hierarchy. As described above, these techniques provide an option to synchronize the layout view with the schematic view. The identification of the current schematic hierarchy enables the option of synchronizing the layout view with the schematic view.

The layout portion identified at 302 may be represented at the current virtual hierarchy at 312. In the aforementioned example, the virtual hierarchy maneuver engine may function in tandem with one or more layout tools to ensure that the figure group is represented at the current virtual hierarchy in the layout portion. In some of these embodiments illustrated in this example, the virtual hierarchy maneuver engine together with the one or more layout tools ensure that only the selected figure group(s), and no other portions of the layout portion, is (are) represented at the current virtual hierarchy.

Similarly, the schematic view may be optionally represented at the current schematic hierarchy at 314. In the aforementioned example where a figure group is selected, the schematic view may be optionally represented at the current schematic hierarchy by identifying the schematic instance corresponding to the figure group, and by ensuring that the schematic view displays the schematic instance but not the schematic circuit components located at a lower schematic hierarchy in the schematic view.

A request to descend into or ascend from a figure group based on the current virtual hierarchy may be received at 316. For example, a designer may double-click on the figure group to issue a request to descend into this figure group. As another example, the designer may issue a command to indicate a maneuver to ascend from the current virtual hierarchy to a higher virtual hierarchy for a specific figure group or for the entire layout portion. The flow diagram illustrates in FIG. 3A then bifurcates into at least two branches 332 and 318 that are separately described below with reference to FIGS. 3B and 3C, respectively.

Figure 3B:
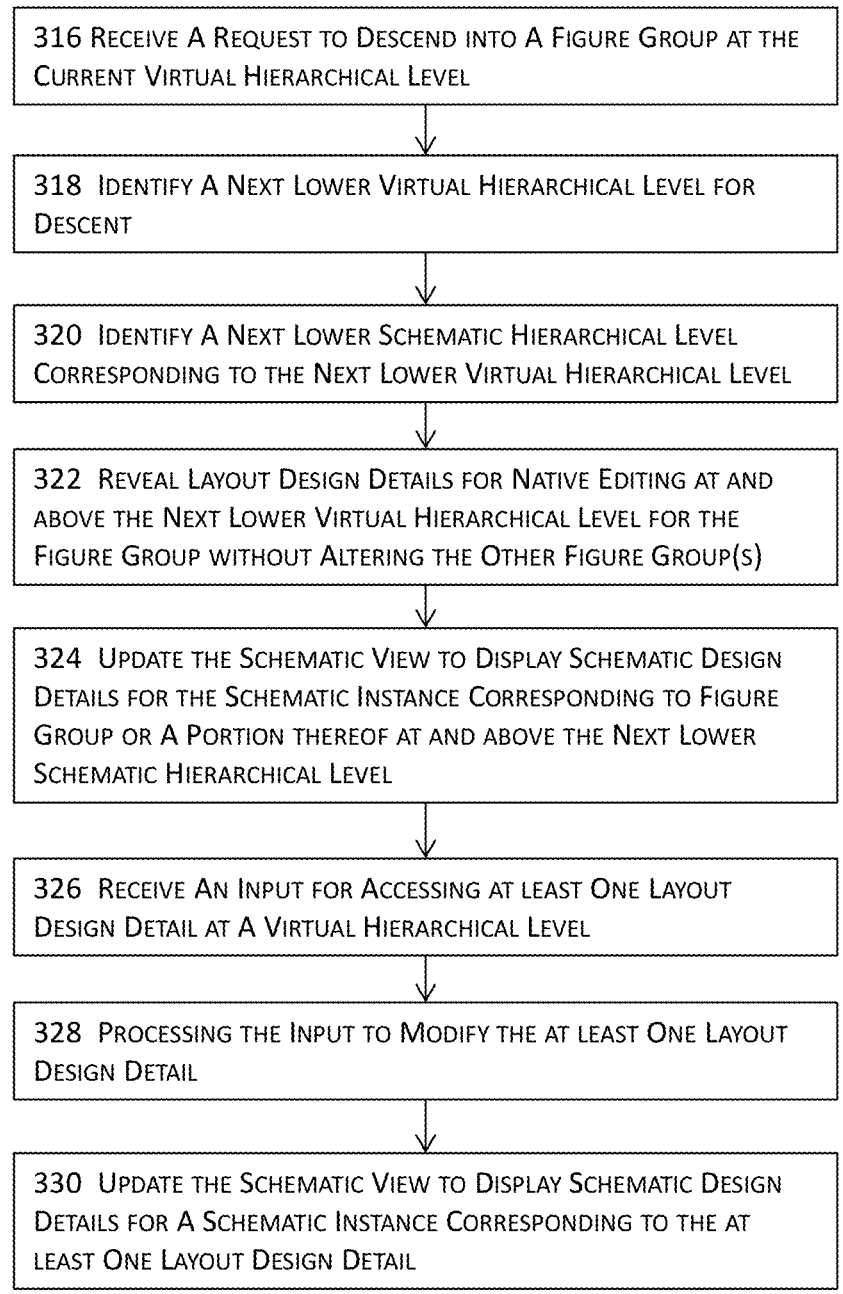
FIG. 3B illustrates more details about an action in FIG. 3A for implementing dynamic maneuvers within virtual hierarchies of an electronic design in one or more embodiments.

In some embodiments illustrated in FIG. 3B, a next lower virtual hierarchy located immediately below the current virtual hierarchy may be identified at 318. In these embodiments, these techniques expose the layout circuit component designs that are located at the level immediately below the current virtual hierarchy at which the figure group is located. In some other embodiments, an option may be set to expose layout circuit component designs located at multiple virtual hierarchies below the current virtual hierarchy. For example, the figure group at the current virtual hierarch may include a first number of layout circuit component designs and a first figure group, both located at a first lower virtual hierarchy immediately below the current virtual hierarchy. The first figure group within the figure group may further include a second number of layout circuit component designs located at a second lower virtual hierarchy immediately below the first lower virtual hierarchy.

In this example, these techniques may provide an option to display the contents at the first lower virtual hierarchy, at multiple lower virtual hierarchies, or at all lower virtual hierarchies. Of course, it is understood that this example only includes two lower virtual hierarchies below the current virtual hierarchy at which the figure group is located so the option of displaying multiple lower virtual hierarchies provides the same effect as the option of displaying all lower virtual hierarchies. Nonetheless, in another example where a figure group includes more than two lower hierarchies, these techniques provide the flexibility of rendering the desired level of details in a figure group.

As an option, the next lower schematic hierarchy immediately below the current schematic hierarchy may be optionally identified at 320. In some embodiments, the next lower schematic hierarchy is identified at 320 by looking up the schematic hierarchical level that corresponding to the next lower virtual hierarchy from the binding information between the schematic design and the layout. In some embodiments where design details at multiple virtual hierarchies are to be revealed in the layout portion, the corresponding multiple schematic hierarchies may be identified at 320 to enable the option of synchronizing the schematic view with the layout view in response to a request to descend into or ascend from a figure group.

Layout design details such as the layout circuit component designs may be revealed to update the layout portion at 322. In some embodiments, layout design details at the next lower virtual hierarchy (or multiple lower virtual hierarchies) may be identified and rendered for the figure group in the layout portion. In some of these embodiments, layout design details at the next lower virtual hierarchy (or multiple lower virtual hierarchies) as well as one or more virtual hierarchies above the next lower virtual hierarchy (e.g., the current virtual hierarchy identified at 308, one or more intervening virtual hierarchies between the current virtual hierarchy and the next lower virtual hierarchy, etc.) may be identified and rendered for the figure group in the layout portion.

The schematic view may be optionally updated at 324 to display schematic design details (e.g., schematic circuit component designs) at the next lower schematic hierarchy at which the schematic instance corresponding to the figure group is located. As an option to synchronize the schematic view with the layout view, schematic design details at the next lower schematic hierarchy (or multiple lower schematic hierarchies) as well as one or more schematic hierarchies above the next lower schematic hierarchy (e.g., the current schematic hierarchy identified at 310, one or more intervening schematic hierarchies between the current schematic hierarchy and the next lower schematic hierarchy, etc.) may be identified and rendered in the schematic view in response to the updated layout portion in the layout view.

An input for accessing at least one layout design detail (e.g., a layout circuit component design) at a virtual hierarchy may be received at 326. The virtual hierarchy maneuver engine and/or the layout tools may then process the input to modify the layout design detail in response to the input at 328. For example, a designer may issue a request with certain instructions to edit a layout circuit component design (e.g., modify the layout circuit component design) in the updated layout portion. In response to the command, the virtual hierarchy maneuver engine and/or the layout tools may identify the virtual hierarchy associated with the input, prepare the layout portion to enable accesses to the layout circuit component based on the identified virtual hierarchy while performing ascent or descent when necessary, and perform the modifications to fulfill the request. The schematic view may further be updated at 330 to reflect the modifications made to the at least one layout design detail in the schematic design so that the schematic view remains synchronized with the layout view when such an option is selected.

The aforementioned examples and description describe descending into a figure group. Nonetheless, identical or substantially similar techniques may also apply when ascending from a figure group to a higher virtual hierarchy. In the case of ascending from a figure group, a figure group may be located at a first virtual hierarchy, and the layout circuit component designs may be located at a second virtual hierarchy immediately below the first virtual hierarchy. A request may be received at an EDA tool to ascend from the layout circuit component designs at the second virtual hierarchy into the figure group at the first virtual hierarchy. In this example, the current virtual hierarchy is identified to be the second virtual hierarchy. Instead of identifying a next lower virtual hierarchy at 318, a next higher virtual hierarchy is identified.

Similar to the current virtual hierarchy and next higher virtual hierarchy in the case of an ascent, the current schematic hierarchy and the next higher schematic hierarchy may be identified. Furthermore, both the current schematic hierarchy and the next higher schematic hierarchy may be identified by looking up from the binding information between the schematic design and the layout. More details about ascending from a virtual hierarchy are described below with reference to FIG. 3C.

In representing the layout portion at the current virtual hierarchy in the case of a descent, the virtual hierarchy maneuver engine (e.g., 112 in FIG. 1) may either alone or in tandem with the one or more layout tools (e.g., 110 in FIG. 1) to identify information about the figure group or the figure group master from one or more data structures.

For example, the virtual hierarchy maneuver engine may identify the location of the figure group in the layout portion (e.g., the coordinates of the lower left-hand corner of the figure group boundary), the list of layout circuit component designs in the figure group, the respective locations of the layout circuit component designs in the figure group, etc. The virtual hierarchy maneuver engine may then function in tandem with one or more layout tools to insert the list of layout circuit component designs into the layout portion at the locations determined by the information identified above.

In some embodiments, a figure group may be stored as an instance of a figure group master. In these embodiments, the figure group instance may be instantiated from the figure group master at the location indicated by the figure group instance. In some other embodiments, a figure group may be stored as a reference to a figure group object where the reference further indicates the location of the figure group. In these latter embodiments, the layout portion may be represented by inserting the figure group object into the layout portion at the location indicated by the reference. It shall be noted that there are many other different methodologies to display the layout circuit component designs of a block or cell (e.g., a figure group which is also considered a virtual block or cell) into a layout portion. Nonetheless, one of the advantages of these techniques is allowing a designer to freely descend into or ascend from a figure group at a virtual hierarchy. Therefore, the specific methodologies to display the layout circuit component designs are provided above as mere examples, and other methodologies may also be used to achieve the same.

Figure 3C:
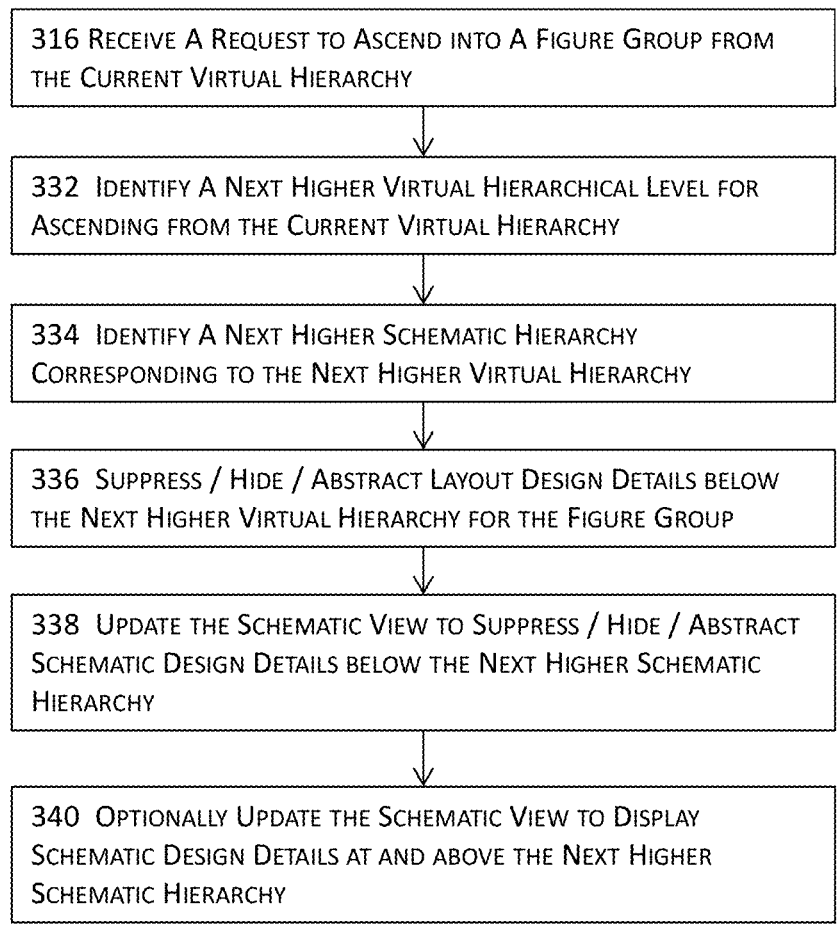
FIG. 3C illustrates more details about an action in FIGS. 3A-3B for implementing dynamic maneuvers within virtual hierarchies of an electronic design in one or more embodiments.

FIG. 3C illustrates more details about an action in FIG. 3A for implementing dynamic maneuvers within virtual hierarchies of an electronic design in one or more embodiments. In these embodiments illustrated in FIG. 3C, a next higher virtual hierarchy maybe identified at 332 for ascending from the current virtual hierarchy. To enable the option for synchronizing the schematic view and the layout view, a next higher schematic hierarchy corresponding to the next higher virtual hierarchy may be identified at 334. In some embodiments, the next higher schematic hierarchy may be identified by looking up from the binding information between the schematic design and the layout based on the next higher virtual hierarchy.

The layout details (e.g., layout circuit component designs below the next higher virtual hierarchy may be suppressed, hidden, or abstracted into one or more abstracted representations at 336 for the figure group. For example, the layout circuit component designs, annotations such as identifications of the layout circuit component designs, stitched information such as the corresponding parasitics or schematic information, etc. may be suppressed or hidden from the selected figure group. In some of these embodiments, the modifications to the layout view are constrained to the selected figure group and do not affect the remaining portion of the layout. The schematic view may also be optionally modified at 338 to suppress or hide the schematic design details below the next higher schematic hierarchy or to abstract the schematic design details below the next higher schematic hierarchy into one or more abstracted schematic representations so that the schematic view and the layout view are synchronized. In addition or in the alternative, the schematic view may also be optionally updated at 340 to display schematic design details at and above the next higher schematic hierarchy.

Figure 4A:
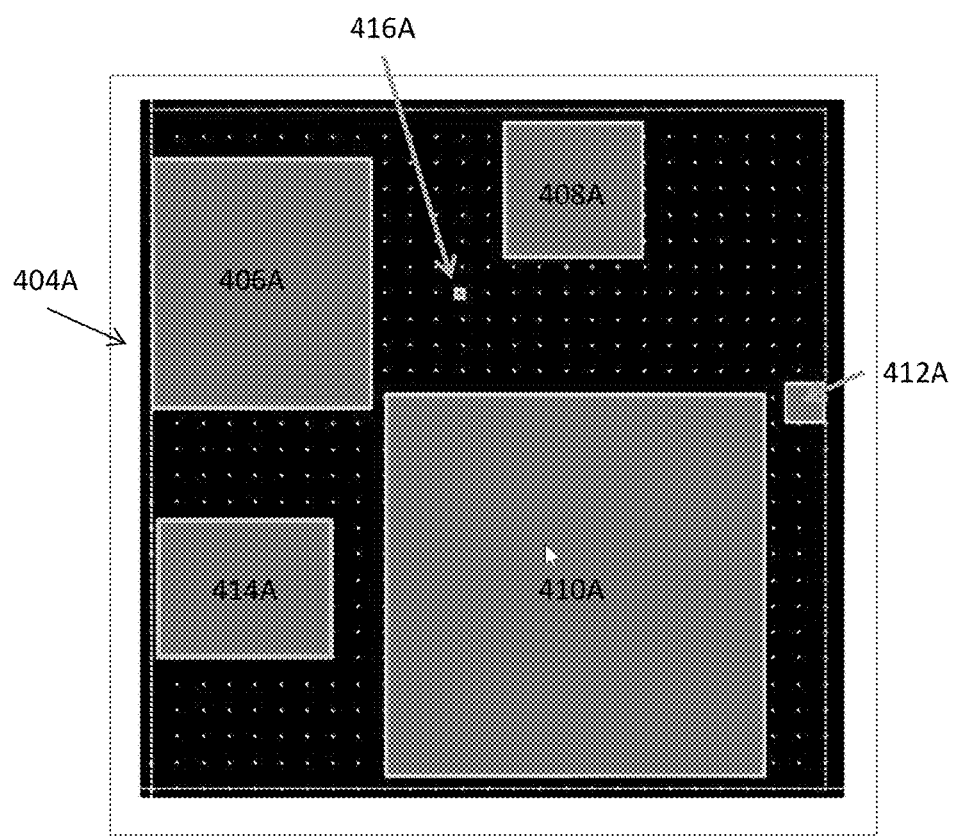
FIGS. 4A-4K illustrate some examples of the application of some techniques for implementing dynamic maneuvers within virtual hierarchies of an electronic design described herein to simplified portions of electronic designs in some embodiments.
Figure 4B:
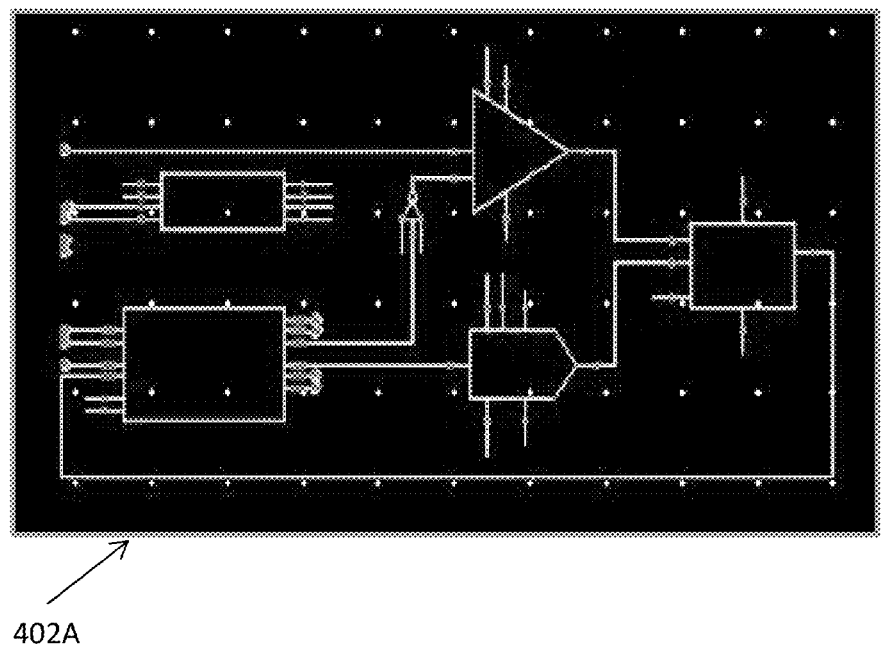
Figure 4C:
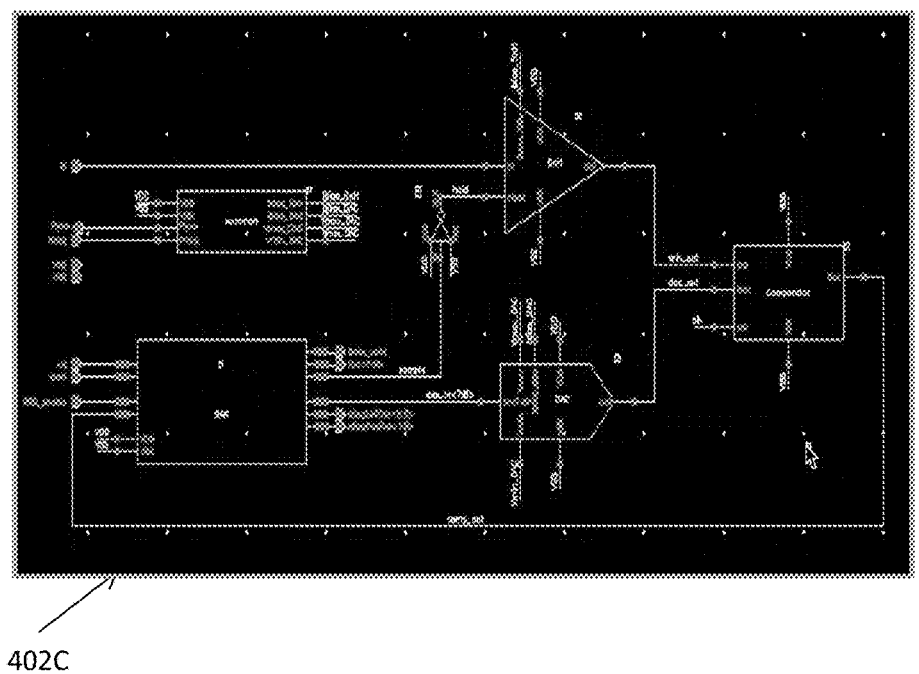

FIGS. 4A-4K illustrate some examples of the application of some techniques for implementing dynamic maneuvers within virtual hierarchies of an electronic design described herein to simplified portions of electronic designs in some embodiments. FIG. 4A illustrates an example of a layout portion 404A including five figure groups 406A, 408A, 410A, 412A, and 414A as well as a discrete layout circuit component design 416A. FIG. 4B illustrates the schematic design portion 402A corresponding to the layout portion 404A in FIG. 4A. FIG. 4C illustrates the capability of adaptive levels of display of a schematic view where some additional annotations are displayed in the schematic view as more display area becomes available (e.g., by zooming in).

Figure 4D:
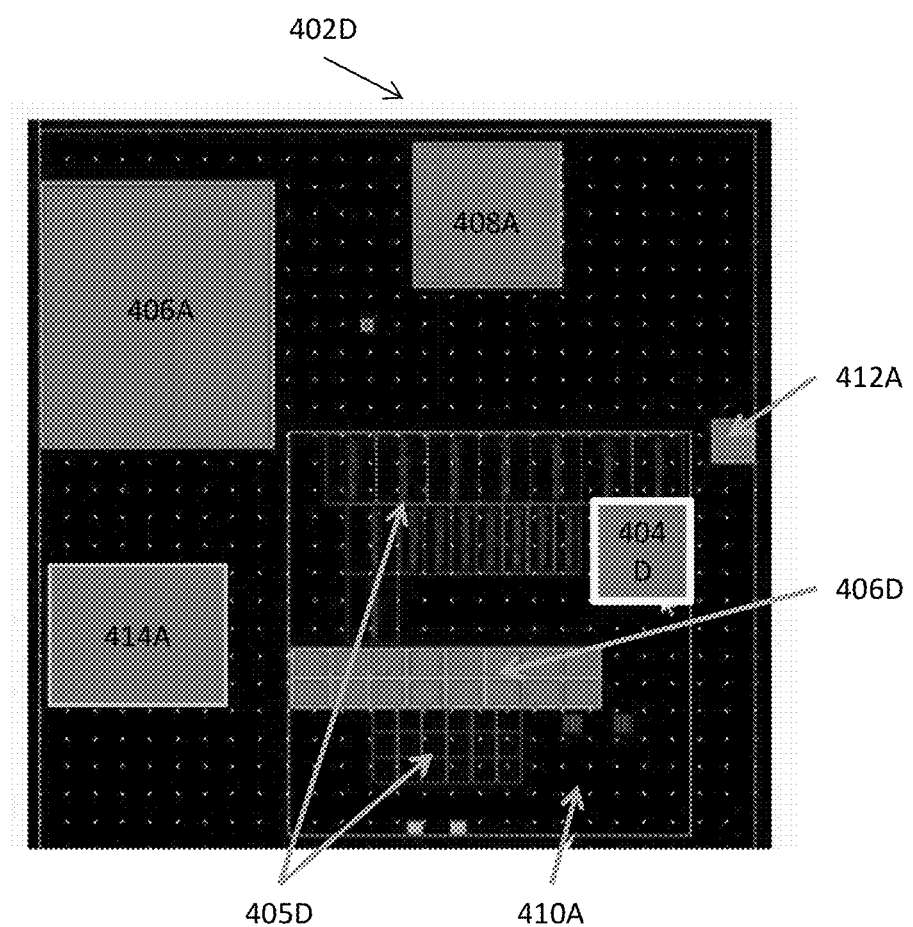

FIG. 4D illustrates the example of dynamically descending into figure group 410A in an updated layout portion. As FIG. 4D illustrates, as the layout portion descends into the first lower virtual hierarchy immediately below the current virtual hierarchy at which figure group 410A is located as shown in FIG. 4A, the virtual hierarchy maneuver engine may either alone or in tandem with one or more layout tools to reveal the layout circuit component designs at this first lower virtual hierarchy. In this example, figure group 410A includes figure group 404D and a plurality of figure groups as synchronous clones 406D together with a plurality of discrete layout circuit component designs 405D at the first lower virtual hierarchy. In response to the request for descent into the first lower virtual hierarchy, the plurality of discrete layout circuit component designs 404D are revealed in figure group 410A. The internal layout details of figure groups 406D and 404D belong to a further lower virtual hierarchy. Therefore, these figure groups within figure group 410A are still represented as abstractions as shown in the updated layout portion 402D. FIG. 4D further illustrates that as the layout portion descends into figure group 410A, the remaining portion of the layout portion (e.g., figure groups 406A, 408A, 412A, 414A, etc.) remain unchanged.

Figure 4E:
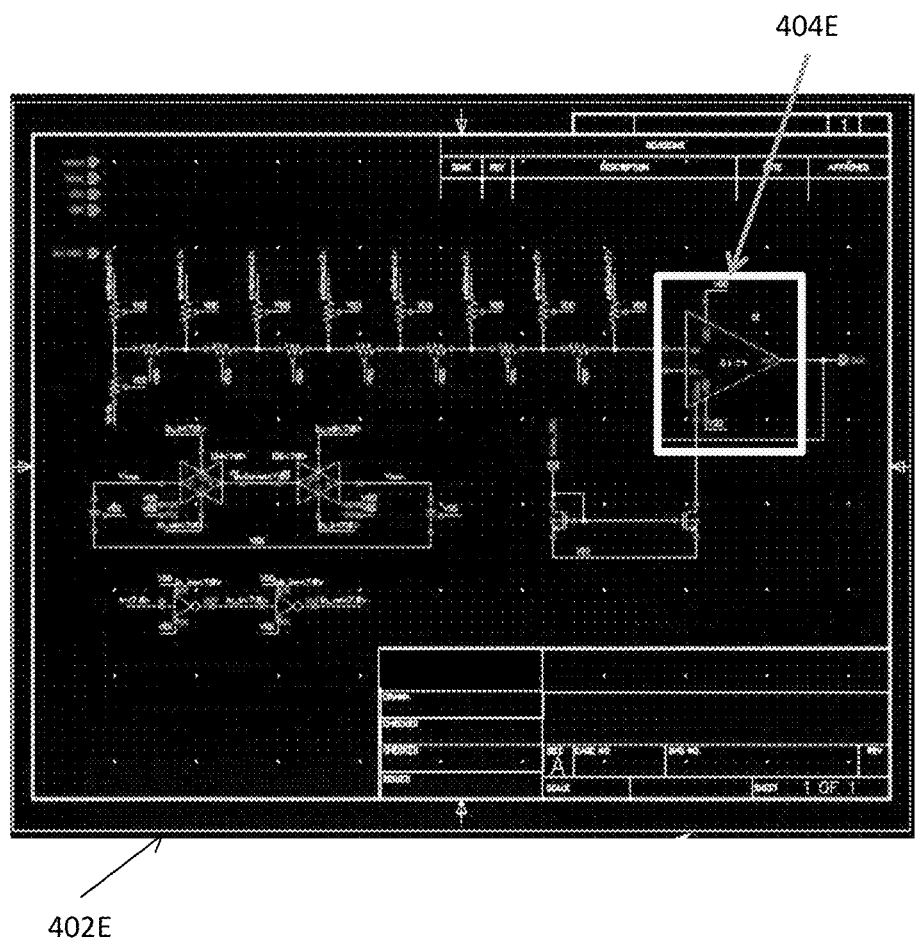

FIG. 4E illustrates the optional update of the schematic view 402C into the updated schematic view 402E to reflect the descent into the first lower virtual hierarchy of figure group 410A. In response to this descent, the schematic view is updated to show the schematic circuit component designs of the schematic instance that corresponds to figure group 410A. In addition, when a designer selects a layout circuit component 404D in the updated layout view 402D, the corresponding schematic circuit component design may also be graphically and/or textually emphasized so that the schematic view and the layout view may be cross referenced. In FIG. 4E, the operational amplifier is enclosed in a rectangular box 404E to reflect the selection of the layout circuit component design 404D in the layout view. Moreover, when a schematic circuit component design is selected in the schematic view, the corresponding layout circuit component design(s) may also be graphically and/or textually emphasized in the layout view.

Figure 4F:
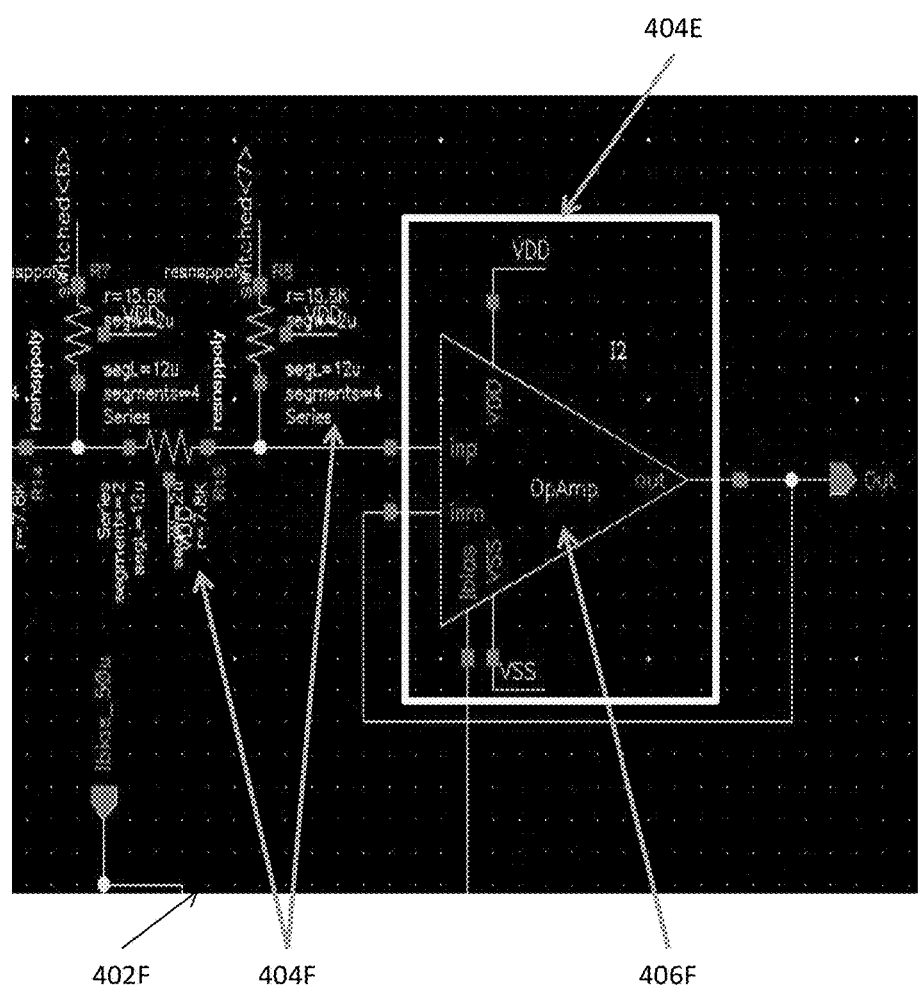

FIG. 4F illustrates a close-up view 402F of the highlighted operational amplifier enclosed in the rectangular box 404E. FIG. 4F also illustrates the capability of adaptive levels of display of the schematic view where some additional annotations (e.g., electrical characteristics 404F such as capacitances, resistances, inductances, serial or parallel connection types, etc. and the names or identifications of devices, etc. 406F) are displayed in the schematic view 402F as more display area becomes available (e.g., by zooming in) when compared to the schematic view 402E.

Figure 4G:
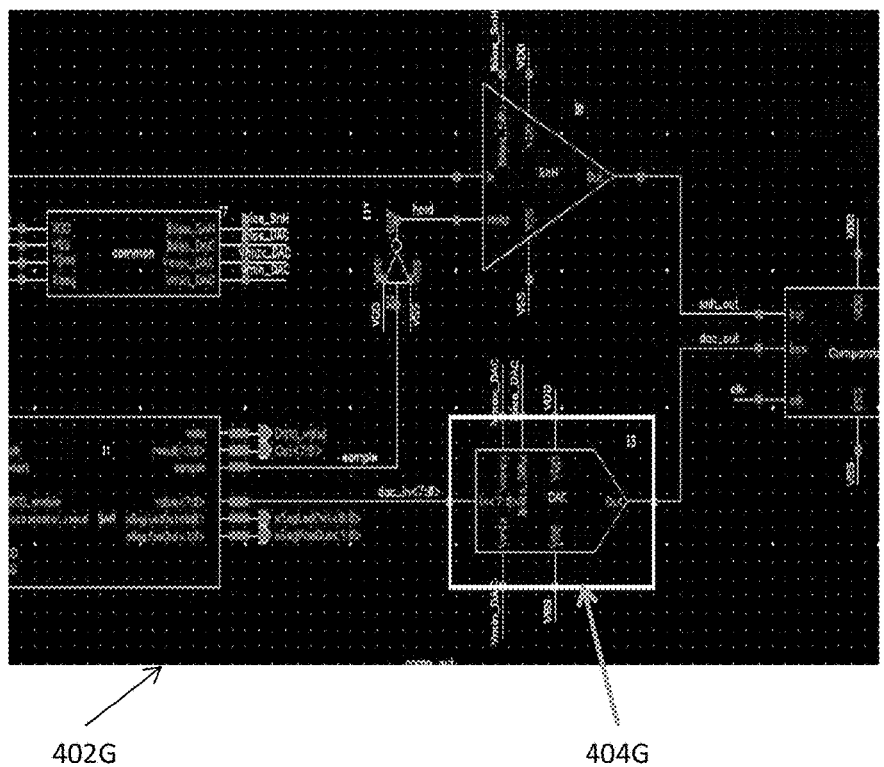

FIG. 4G illustrates the schematic portion corresponding to the descent into figure group 410A in the layout portion 402D in FIG. 4D. As described above, synchronizing the layout view and the schematic view is entirely optional. In FIG. 4G, the schematic view 402G is not updated to reflect the descent into figure group 410A. Nonetheless, the schematic circuit component design 404G is still emphasized in the schematic view 402G to indicate the descent into the figure group 410A in the layout view.

Figure 4H:
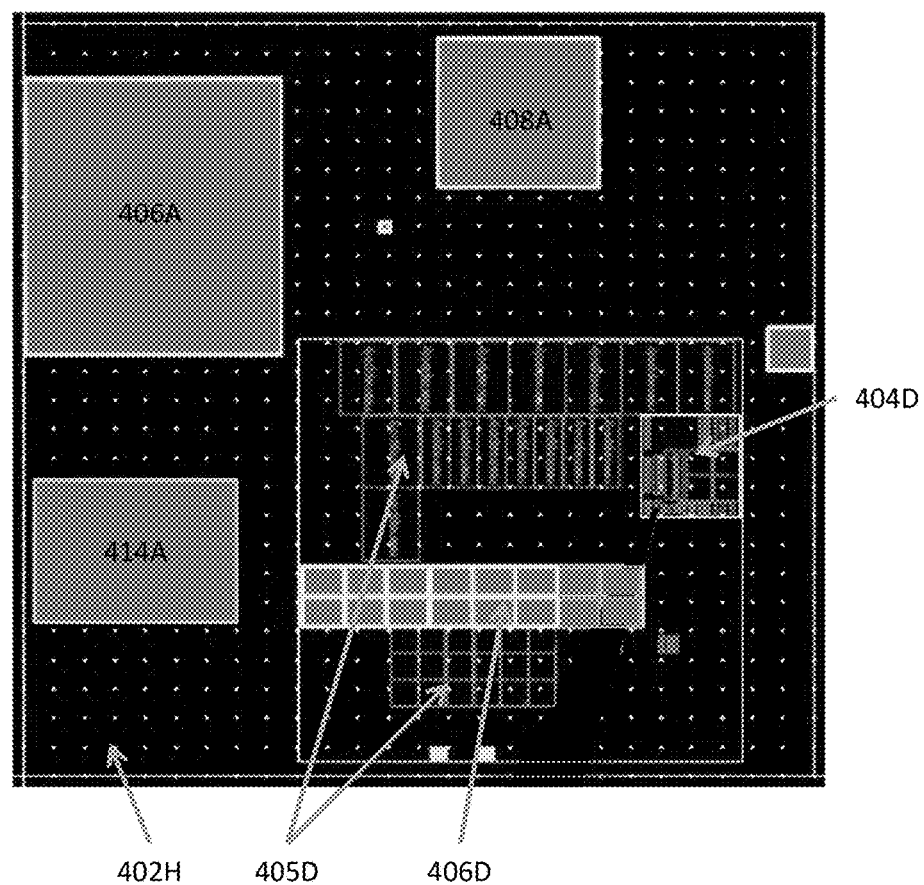

FIG. 4H illustrates the example of further descending into FIG. 404D within figure group 410A. As FIG. 4H shows, the layout circuit component designs in figure group 404D are revealed in the updated layout portion 402H, whereas the figure groups 406D (albeit at the same virtual hierarchy as figure group 404D) as well as figure groups 406A, 408A, 412A, and 414A remain unchanged as abstractions in the updated layout view 402H.

Figure 4I:
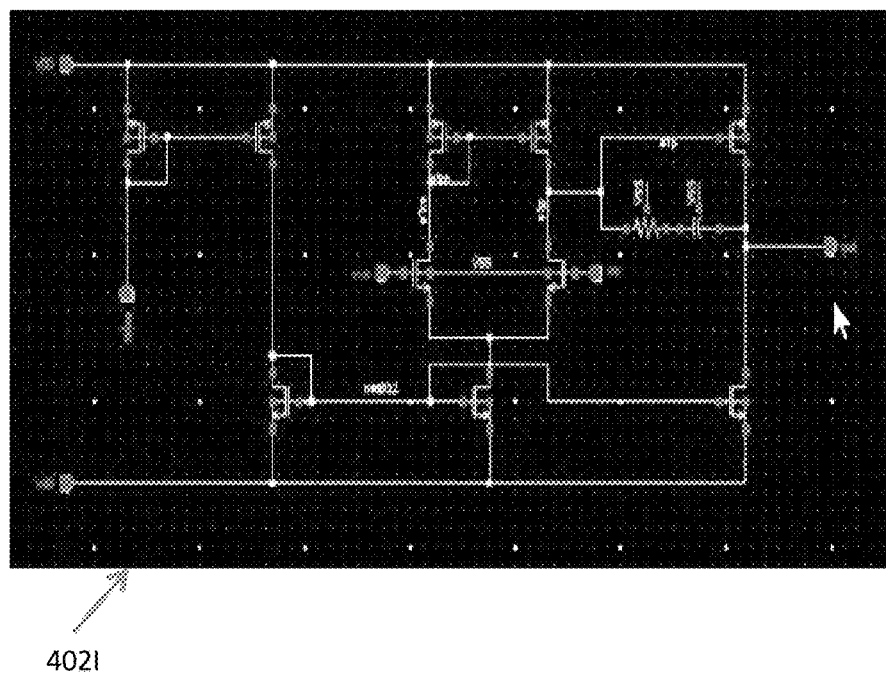

FIG. 4I illustrates the optionally updated schematic view 402I to reveal the schematic circuit component designs corresponding to the layout circuit component designs revealed in figure group 404D in the layout portion 402H due to the descent into figure group 404D.

Figure 4J:
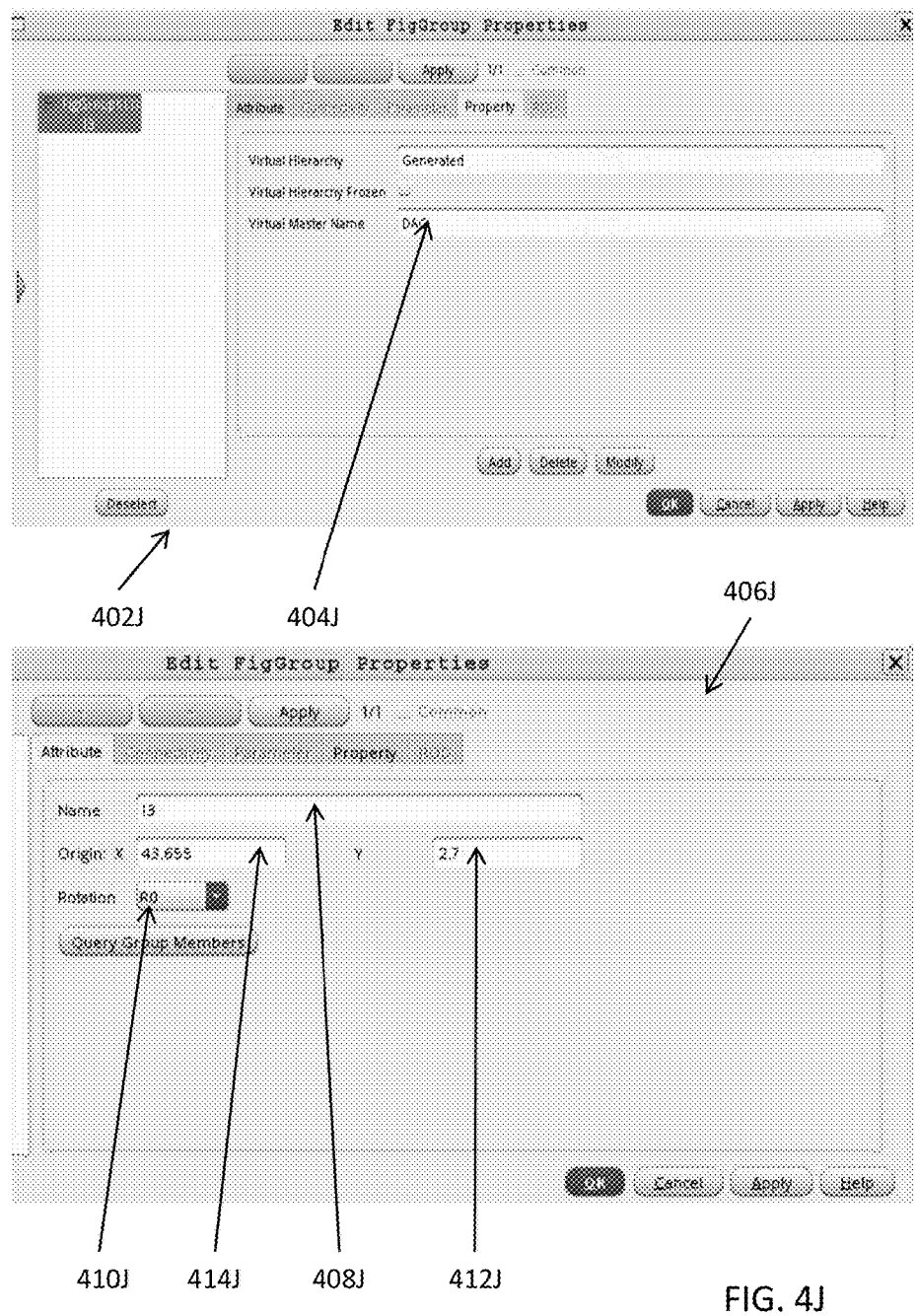

FIG. 4J illustrates configuration windows for figure groups and virtual hierarchies. More specifically, a figure group (e.g., figure group 410A) may be associated or decorated with an identification (e.g., a name) 404J of the virtual master. This identification 404J of the virtual master may be automatically populated from the name of the schematic master, an instance of which corresponds to the figure group in the layout, as shown in the figure group configuration window 402J. A figure group may also be associated or decorated with the identification (e.g., name) 408J of the schematic instance corresponding to the figure group in the layout. This identification 408J of the virtual master may be automatically populated from the name of the schematic instance that corresponds to the figure group in the layout, as shown in the figure group configuration window 406J. A figure group may also include or be associated or decorated with the orientation 410J and/or the location (e.g., the X-coordinate 414J and the Y-coordinate 412J) in a layout.

Figure 4K:
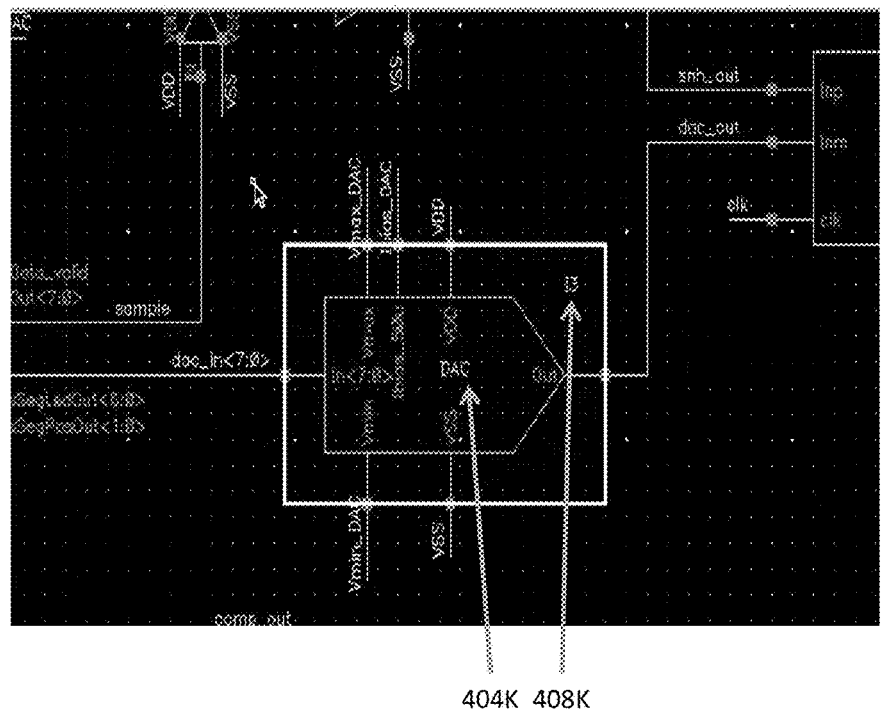

FIG. 4K illustrates an example of the binding information between a schematic and the corresponding layout. More specifically, FIG. 4K illustrates the schematic instance that corresponds to figure group 410A. As FIG. 4K shows, the schematic instance name "I3" (408K) and the schematic master name "DAC" (404K) may be automatically populated and used to decorate figure group 410A as shown in 408J and 404J in FIG. 4J, respectively. One of the functions of this binding information is, as described above, to enable automatic creation of figure groups in a layout, regardless of whether the layout is being created or whether the layout has already been created.

Figure 5:
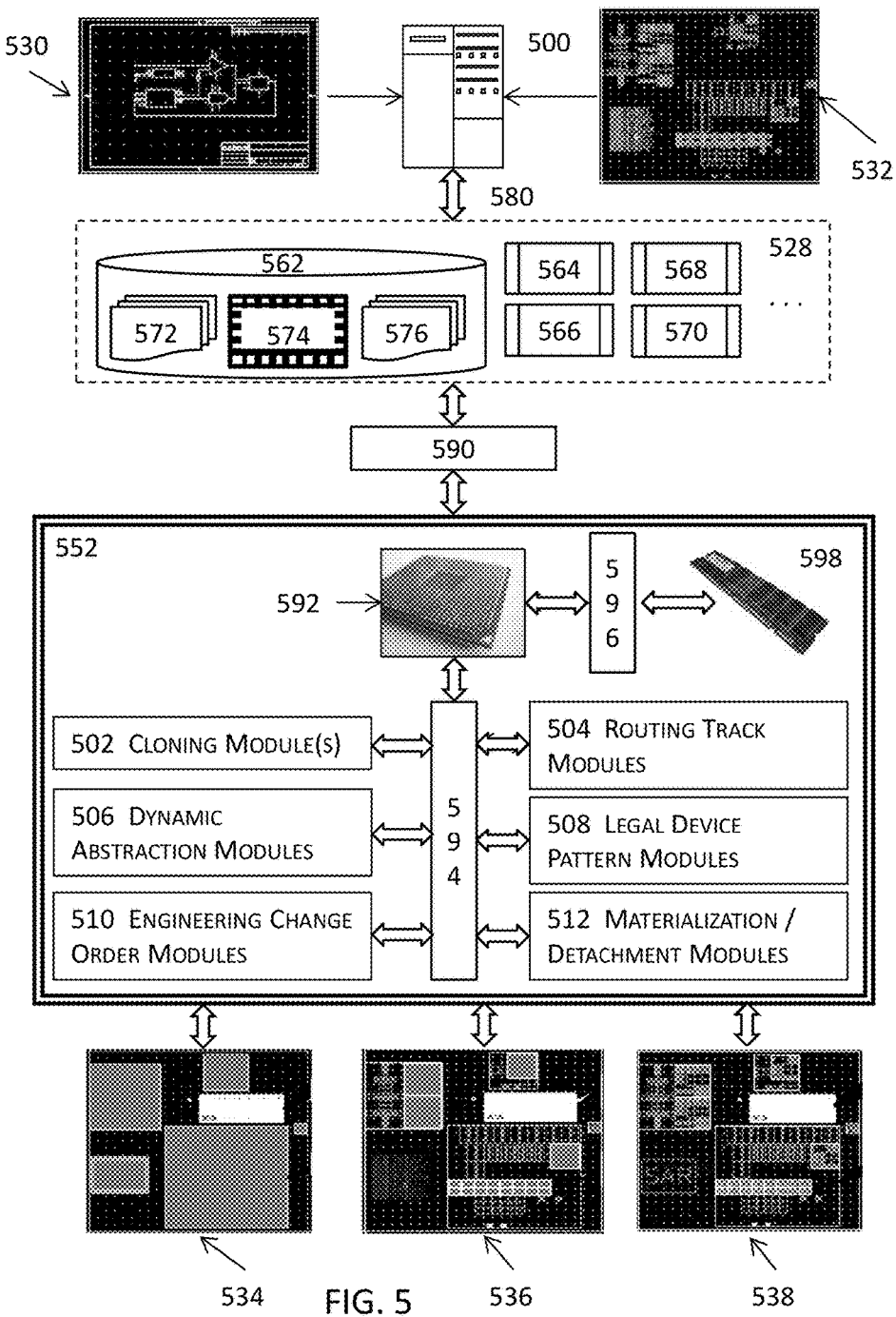
FIG. 5 illustrates another high level block diagram of a simplified system for implementing dynamic maneuvers within virtual hierarchies of an electronic design in one or more embodiments.

FIG. 5 illustrates another high level block diagram of a simplified system for implementing dynamic maneuvers within virtual hierarchies of an electronic design in one or more embodiments. In these one or more embodiments, the hardware system in FIG. 5 may comprise one or more computing systems 500, such as one or more general purpose computers described in the System Architecture Overview section to implement one or more special proposes. The illustrative system in FIG. 5 may include an Internet-based computing platform providing a shared pool of configurable computer processing resources (e.g., computer networks, servers, storage, applications, services, etc.) and data to other computers and devices in an ubiquitous, on-demand basis via the Internet. For example, one or more computing resources and/or modules illustrated in FIG. 5 may be located in a cloud computing platform in some embodiments.

In some embodiments, the one or more computing systems 500 may invoke various system resources such as the processor(s) or processor core(s), memory, disks, etc. and receive a layout 530 including a figure group having a plurality of layout devices. The one or more computing systems 500 receive a layout 532 including a plurality of virtual hierarchies and optionally the corresponding schematic 530 that is bound to the layout 532. The one or more computing systems 500 may identify a current virtual hierarchy and prepare the layout view 534 to display layout design details at the current virtual hierarchy. The one or more computing systems 500 may determine a first desired virtual hierarchy in response to a request to descend into or ascend from a figure group and update the layout view as the updated layout view 536. Different desired virtual hierarchies may result in different updated layouts 536 and 538 each providing different levels of details and different levels of abstractions in the layout window of the user interface in response to the desired virtual hierarchies in the request for descent or ascent.

The one or more computing systems 500 may further write to and read from a local or remote non-transitory computer accessible storage 562 that stores thereupon data or information such as, but not limited to, one or more databases (574) such as schematic design database(s) or physical design database(s), electronic circuit design specification database(s), various statistics, various data, rule decks, various design rules, constraints, etc. (572), or other information or data (576) that may be used to facilitate the performance of various functions to achieve the intended purposes.

The one or more databases 574 may further include a plurality of cells, blocks, or modules (collectively a cell for singular and cells for plural). Cells may include, for example, one or more standard cells, one or more library cells, one or more memory cells, one or more macro cells, or any combinations thereof. A cell may be an object of a class in the paradigm of object oriented programming and may thus be instantiated into multiple instances to create at least a portion of a hierarchical physical design (e.g., a floorplan, a layout, etc.) or to create a larger and/or more complex cell in some embodiments. In the real hierarchy structure of a hierarchical physical design, certain cells may be situated at the lowest hierarchical level and do not contain any lower hierarchies.

In some embodiments, the one or more computing systems 500 may include or, either directly or indirectly through the various resources 528, invoke a set of mechanisms or modules 552 including hardware and software modules or combinations of one or more hardware and one or more software modules that are stored at least partially in computer memory may comprises one or more cloning modules 502 to identify and/or create clones.

A cloning module 502 may by itself or in tandem with one or more other modules identify or create clones in the layout 532 that may be optionally materialized into a physical block or cell 534. The one or more computing systems 500 may also initiate or interact with other computing systems to access, via a computer bus architecture (e.g., a system bus, a control bus, a data bus, or any combinations thereof), various resources 528 that may comprise a floorplanner, a placement module, a global routing module, and/or a detail routing module 564, a layout editor 566, a design rule checker 568, a verification engine 570, etc.

The set of modules 552 may further include one or more routing track modules 504 to manage and determine routing tracks that may be inherited by various figure groups at one or more virtual hierarchies without causing any violations of rules for routing track assignments, routing track coloring, etc. The set of modules 552 may further optionally include one or more dynamic abstraction modules 506 to identify the appropriate virtual hierarchy in response to a display stop level value, identify the pertinent layout component designs for display, display the identify pertinent layout component designs, and abstract design details belonging to one or more lower virtual hierarchies below the identified virtual hierarchy.

In addition or in the alternative, the set of modules 552 may further include one or more legal device pattern modules 508 to identify and/or create legal device patterns into one or more figure groups so that all the pertinent rules or requirements will be automatically complied with so long as the arrangements in these legal device patters are observed. In some embodiments, the set of modules 552 may further include one or more engineering change order (ECO) modules 510 to function in tandem with figure groups and virtual hierarchies to implement engineering change orders.

The set of modules 552 may also include a detachment or materialization module 512 to materialize a figure group into a physical block and to materialize a virtual hierarchy into a physical hierarchy and update the physical hierarchical structure of a layout accordingly. Any of these modules described may be stored at least partially in memory and include or function in tandem with one or more microprocessors or one or more processor cores to perform respective functions described herein. The set of modules 552 may further optionally include one or more signoff modules (not shown) to perform various signoff and design closure tasks to ensure that the electronic design implemented by various techniques described herein may be successfully fabricated while maintaining various performance, cost, reliability, and manufacturability requirements.

For example, the one or more signoff modules may include one or more timing signoff modules to perform timing analyses and timing closure related tasks (e.g., silicon-accurate timing signoff, signal integrity analyses, etc.) to ensure an electronic design meets power, performance, or other requirements before tapeout, one or more signoff parasitic extraction modules to provide silicon-accurate interconnect parasitic extraction and ensure first-pass silicon success, and one or more power signoff modules to perform various power integrity analyses, transistor-level electromigration and IR-drop analyses, or other power and signal integrity analyses with SPICE-level accuracy or better accuracy with SPICE or SPICE-like simulations (e.g., Fast-SPICE, HSPICE, PSPICE, or any other SPICE-based or SPICE-compatible simulations) to ensure an electronic design meets or exceeds power, performance, and/or area goals in some embodiments.

The one or more signoff modules may include one or more physical verification modules (not shown) to perform various design rule checking, layout vs. schematic (LVS), etc. tasks to ensure that an electronic design meets or exceeds various spatial and other physical rules and one or more design for manufacturing (DFM) modules to address physical signoff and electrical variability optimization, correct lithography hotspots, predict silicon contours, improve yield, detect and repair timing and leakage hotspots to achieve variation- and manufacturing-aware signoff and design closure in some of these embodiments.

In addition or in the alternative, the one or more signoff modules may include one or more one or more computational lithography modules (not shown) to provide more accurate post-etch critical dimension accuracy and process windows on silicon, reticle and wafer synthesis, etc. to eliminate errors and/or reduce mask-manufacturing cycle times. One or more of these signoff modules may operate on the electronic design produced or modified with various techniques to be described in the following sections for proper signoff and design closure so that the signoff version of the electronic design may be properly manufactured with first-pass or fewer passes silicon success in some embodiments. In these embodiments, the signoff version of the electronic design produced or modified with various techniques described herein causes the underlying electronic circuit to be manufactured by a foundry or IC (integrated circuit) fabrication facility when the signoff version of the electronic design is forwarded to the foundry or IC (integrated circuits) fabrication facility that in turn fabricates the requisite photomasks and the eventual electronic circuit.

In some embodiments, the computing system 500 may include the various resources 528 such that these various resources may be invoked from within the computing system via a computer bus 580 (e.g., a data bus interfacing a microprocessor 592 and the non-transitory computer accessible storage medium 598 or a system bus 590 between a microprocessor 592 and one or more engines in the various resources 528). In some other embodiments, some or all of these various resources may be located remotely from the computing system 500 such that the computing system may access the some or all of these resources via a computer bus 580 and one or more network components.

The computing system may also include one or more modules in the set of modules 552. These one or more modules in the set 552 may include or at least function in tandem with a microprocessor 592 via a computer bus 594 in some embodiments. In these embodiments, a single microprocessor 592 may be included in and thus shared among more than one module even when the computing system 500 includes only one microprocessor 592. A microprocessor 592 may further access some non-transitory memory 598 (e.g., random access memory or RAM) via a system bus 596 to read and/or write data during the microprocessor's execution of processes.

In various embodiments described herein, a layout may be generated by proceeding through the floorplanning stage, the placement stage, and the routing stage before the layout may be further processed for various verification and optimization tasks. A designer may often need to manipulate a plurality of layout components. For example, a designer may need to change the arrangement of a plurality of layout components from four rows of four layout components in each row to two rows of eight components in a cell. Conventional approaches require checking out all sixteen layout components and the cell from the layout database, remove the top two rows each including four layout components, and add four layout components to each of the remaining two rows. Conventional approaches thus require a large amount of computational resources in terms of at least network access as well as the runtime and memory footprint of checking out and accessing the cell as well as the individual layout components.

These techniques described herein conserve computational resource utilization without checking out and checking in the cell or the individual layout components from the layout database. Rather, these techniques may simply access the figure group including four rows of figures representing the four rows of layout components, remove the top two rows each having four figures, adding four figures to each of the two remaining rows while observing the controlling design rules and constraints, and save the figure group.

System Architecture Overview

Figure 6:
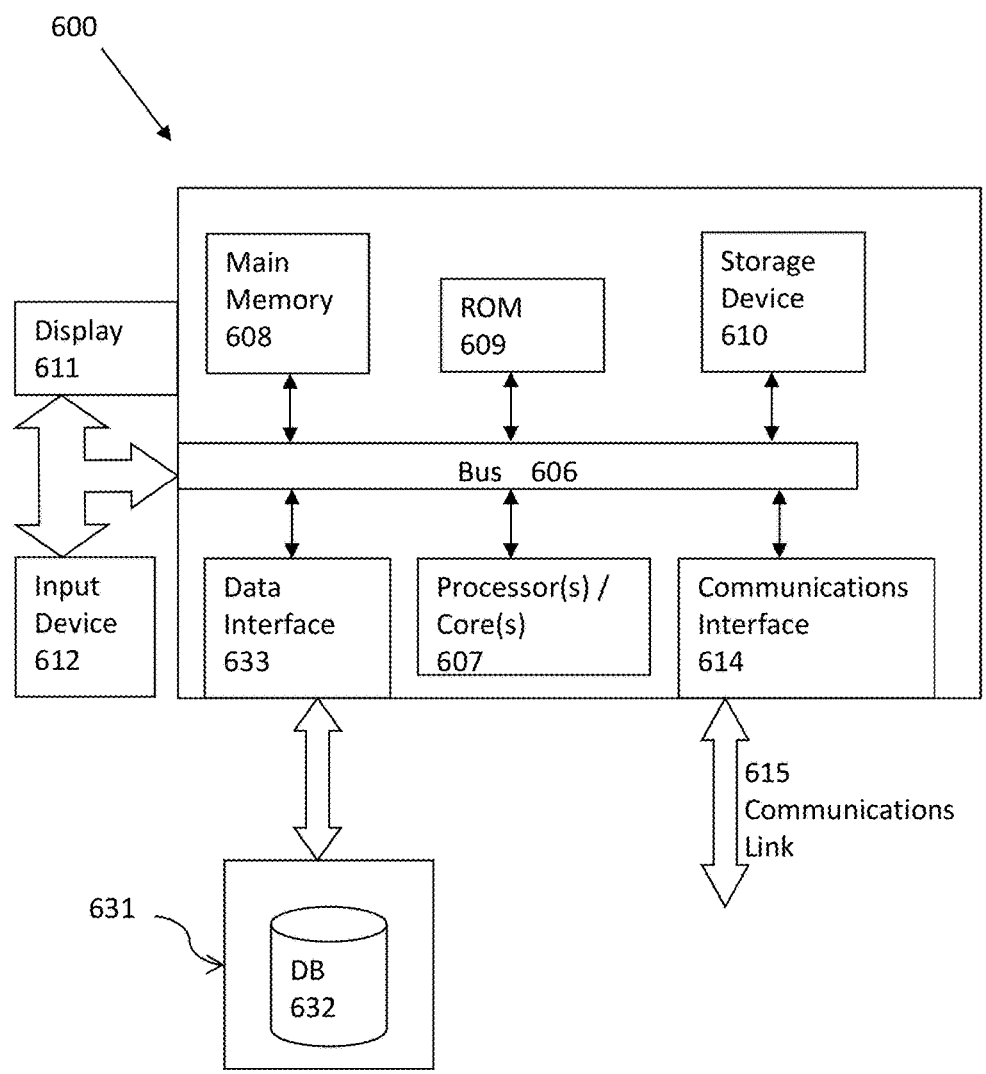
FIG. 6 illustrates a computerized system on which a method for implementing dynamic maneuvers within virtual hierarchies of an electronic design may be implemented.

FIG. 6 illustrates a computerized system on which a method for implementing dynamic maneuvers within virtual hierarchies of an electronic design may be implemented. Computer system 600 includes a bus 606 or other communication module for communicating information, which interconnects subsystems and devices, such as processor 607, system memory 608 (e.g., RAM), static storage device 609 (e.g., ROM), disk drive 610 (e.g., magnetic or optical), communication interface 614 (e.g., modem or Ethernet card), display 611 (e.g., CRT or LCD), input device 612 (e.g., keyboard), and cursor control (not shown). The illustrative computing system 600 may include an Internet-based computing platform providing a shared pool of configurable computer processing resources (e.g., computer networks, servers, storage, applications, services, etc.) and data to other computers and devices in an ubiquitous, on-demand basis via the Internet. For example, the computing system 600 may include or may be a part of a cloud computing platform in some embodiments.

According to one embodiment, computer system 600 performs specific operations by one or more processor or processor cores 607 executing one or more sequences of one or more instructions contained in system memory 608. Such instructions may be read into system memory 608 from another computer readable/usable storage medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 607, where the one or more processors, one or more processor cores, or combination thereof executes one or more threads. For example, the acts of determination, extraction, stitching, simulating, annotating, analyzing, optimizing, and/or identifying, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any non-transitory medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 600. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program (e.g., application code) through communication link 615 and communication interface 614. Received program code may be executed by processor 607 as it is received, and/or stored in disk drive 610, or other non-volatile storage for later execution. In an embodiment, the computer system 600 operates in conjunction with a data storage system 631, e.g., a data storage system 631 that includes a database 632 that is readily accessible by the computer system 600. The computer system 600 communicates with the data storage system 631 through a data interface 633. A data interface 633, which is coupled to the bus 606 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 633 may be performed by the communication interface 614.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

I claim:

1. A computer implemented method for implementing dynamic maneuvers within virtual hierarchies of an electronic design, comprising:

executing, at a virtual hierarchy maneuver module coupled to a micro-processor of a computing system, a sequence of instructions to perform a process, the process comprising:

identifying or generating a plurality of figure groups at one or more virtual hierarchies in a layout portion;

receiving a request to descend into or ascend from a figure group at a virtual hierarchy of the one or more virtual hierarchies; and updating a layout view into an updated layout view at least by descending into or ascending from the figure group and by exposing layout design details in the figure group for native editing according to the request to descend into or ascend from the figure group while reducing or avoiding cluttering a user interface showing the layout view and reducing or avoiding network roundtrips for checking in modified physical design structures at one or more physical hierarchies into a design database via a computer network for the native editing of the layout view.

2. The computer implemented method of claim 1, the process further comprising:

identifying a current virtual hierarchy for the layout view; and representing the layout view with the layout design details at the current virtual hierarchy, wherein the layout design details include a plurality of layout circuit component designs that belong to the figure group and are located at the current virtual hierarchy.

3. The computer implemented method of claim 2, the process further comprising:

identifying a schematic view that corresponds to the layout view; and updating the schematic view based in part or in whole upon updating the layout view into the updated layout view.

4. The computer implemented method of claim 3, the process further comprising:

identifying a current schematic hierarchy for the schematic view; and representing the schematic view with schematic design details at the current schematic hierarchy, wherein the schematic design details include a plurality of schematic circuit component designs that belong to a schematic instance corresponding to the figure group and are located at the current schematic hierarchy.

5. The computer implemented method of claim 4, the process further comprising:

receiving a request to descend into or ascend from the figure group based on the current virtual hierarchy.

6. The computer implemented method of claim 5, the process further comprising:

identifying a next lower virtual hierarchy for descending into the figure group from the current virtual hierarchy; and updating the layout view into the updated layout view at least by exposing the layout design details located at the next lower virtual hierarchy for the figure group.

7. The computer implemented method of claim 6, the process further comprising:

updating the layout view into the updated layout view at least by exposing the layout design details located at one or more virtual hierarchies situated above the next lower virtual hierarchy for the figure group.

8. The computer implemented method of claim 6, the process further comprising:

identifying a next lower schematic hierarchy corresponding to the next lower virtual hierarchy by using at least binding information between the layout view and the schematic view; and updating the schematic view into the updated schematic view at least by exposing the schematic design details that are located at the next lower schematic hierarchy and one or more schematic hierarchies situated above the next lower schematic hierarchy for the schematic instance.

9. The computer implemented method of claim 8, the process further comprising:

receiving an input for modifying at least one layout design detail of the layout design details in the figure group;

processing the input to modifying the at least one layout design detail in the updated layout view; and updating the updated schematic view by modifying the schematic design details of the schematic instance based in part or in whole upon modifying the at least one design detail in the updated layout.

10. The computer implemented method of claim 6, the process further comprising:

identifying a next higher virtual hierarchy for ascending from the current virtual hierarchy for the figure group; and updating the layout view into the updated layout view at least by suppressing or hiding the layout design details located at one or more lower hierarchies below the next higher virtual hierarchy or by abstracting the layout design details located at the one or more lower virtual hierarchies below the next higher virtual hierarchy into one or more abstracted representations for the figure group.

11. The computer implemented method of claim 10, the process further comprising:

identifying a next higher schematic hierarchy according to the next higher virtual hierarchy based in part or in whole on binding information between the layout view and the schematic view; and updating the schematic view into the updated schematic view at least by suppressing or hiding the schematic design details located at one or more lower schematic hierarchies below the next higher schematic hierarchy or by abstracting at least some of the schematic design details located at the one or more lower schematic hierarchies below the next higher schematic hierarchy into one or more abstracted representations for the schematic instance corresponding to the figure group.

12. The computer implemented method of claim 11, the process further comprising:

storing at least the updated layout view or the updated schematic view corresponding to the in a cache of the computing system or in a non-transitory, non-persistent or persistent computer accessible storage medium; and reusing the at least the updated layout view or the updated schematic view by retrieving from the cache or from the non-transitory, non-persistent or persistent computer accessible storage medium.

13. A system for implementing dynamic maneuvers within virtual hierarchies of an electronic design, comprising:

non-transitory computer accessible storage medium storing thereupon program code;

a virtual hierarchy maneuver module that is stored at least partially in memory of one or more computing systems, include or function in conjunction with at least one micro-processor of the one or more computing systems, and are configured to execute the program code to identify or generate a plurality of figure groups at one or more virtual hierarchies in a layout portion;

the virtual hierarchy maneuver module further executing the program code to receive a request to descend into or ascend from a figure group at a virtual hierarchy of the one or more virtual hierarchies;

the virtual hierarchy maneuver module further executing the program code to update a layout view into an updated layout view at least by descending into or ascending from the figure group and by exposing layout design details for native editing according to the request to descend into or ascend from the figure group while reducing or avoiding cluttering a user interface showing the layout view and reducing or avoiding network roundtrips for checking in modified physical design structures at one or more physical hierarchies into a design database via a computer network for the native editing of the layout view.

14. The system for claim 13, the virtual hierarchy maneuver module further executing the program code to:

identify a current virtual hierarchy for the layout view;

represent the layout view with the layout design details at the current virtual hierarchy, wherein the layout design details include a plurality of layout circuit component designs that belong to the figure group and are located at the current virtual hierarchy;

identify a schematic view that corresponds to the layout view; and update the schematic view based in part or in whole upon updating the layout view into the updated layout view.

15. The system for claim 14, the virtual hierarchy maneuver module further executing the program code to:

identifying a current schematic hierarchy for the schematic view;

representing the schematic view with schematic design details at the current schematic hierarchy, wherein the schematic design details include a plurality of schematic circuit component designs that belong to a schematic instance corresponding to the figure group and are located at the current schematic hierarchy; and receiving a request to descend into or ascend from the figure group based on the current virtual hierarchy.

16. The system for claim 15, the virtual hierarchy maneuver module further executing the program code to:

identifying a next lower virtual hierarchy for descending into the figure group from the current virtual hierarchy; and updating the layout view into the updated layout view at least by exposing the layout design details located at one or more virtual hierarchies situated above the next lower virtual hierarchy for the figure group.

17. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing dynamic maneuvers within virtual hierarchies of an electronic design, the set of acts comprising:

executing, at a virtual hierarchy maneuver module coupled to a micro-processor of a computing system, a sequence of instructions to perform a process, the process comprising:

identifying or generating a plurality of figure groups at one or more virtual hierarchies in a layout portion;

receiving a request to descend into or ascend from a figure group at a virtual hierarchy of the one or more virtual hierarchies; and updating a layout view into an updated layout view at least by descending into or ascending from the figure group and by exposing layout design details in the figure group for native editing according to the request to descend into or ascend from the figure group while reducing or avoiding cluttering a user interface showing the layout view and reducing or avoiding network roundtrips for checking in modified physical design structures at one or more physical hierarchies into a design database via a computer network for the native editing of the layout view.

18. The article of manufacture of claim 17, the set of acts further comprising:

identifying a current virtual hierarchy for the layout view;

representing the layout view with the layout design details at the current virtual hierarchy, wherein the layout design details include a plurality of layout circuit component designs that belong to the figure group and are located at the current virtual hierarchy;

identifying a schematic view that corresponds to the layout view;

updating the schematic view based in part or in whole upon updating the layout view into the updated layout view;

identifying a current schematic hierarchy for the schematic view;

representing the schematic view with schematic design details at the current schematic hierarchy, wherein the schematic design details include a plurality of schematic circuit component designs that belong to a schematic instance corresponding to the figure group and are located at the current schematic hierarchy; and receiving a request to descend into or ascend from the figure group based on the current virtual hierarchy.

19. The article of manufacture of claim 18, the set of acts further comprising:

identifying a next higher virtual hierarchy for ascending from the current virtual hierarchy for the figure group;

updating the layout view into the updated layout view at least by suppressing or hiding the layout design details located at one or more lower hierarchies below the next higher virtual hierarchy or by abstracting the layout design details located at the one or more lower virtual hierarchies below the next higher virtual hierarchy into one or more abstracted representations for the figure group;

identifying a next higher schematic hierarchy according to the next higher virtual hierarchy based in part or in whole on binding information between the layout view and the schematic view; and updating the schematic view into the updated schematic view at least by suppressing or hiding the schematic design details located at one or more lower schematic hierarchies below the next higher schematic hierarchy or by abstracting at least some of the schematic design details located at the one or more lower schematic hierarchies below the next higher schematic hierarchy into one or more abstracted representations for the schematic instance corresponding to the figure group.

20. The article of manufacture of claim 19, the set of acts further comprising:

storing at least the updated layout view or the updated schematic view corresponding to the in a cache of the computing system or in a non-transitory, non-persistent or persistent computer accessible storage medium; and reusing the at least the updated layout view or the updated schematic view by retrieving from the cache or from the non-transitory, non-persistent or persistent computer accessible storage medium.

* * * * *